US008804689B2

(12) United States Patent
Madan et al.

(10) Patent No.: US 8,804,689 B2
(45) Date of Patent: Aug. 12, 2014

(54) METHODS AND APPARATUS FOR PEER-TO-PEER COMMUNICATIONS RESOURCE SCHEDULING

(75) Inventors: Ritesh K. Madan, Jersey City, NJ (US); Junyi Li, Chester, NJ (US)

(73) Assignee: QUALCOMMM Incorporated, San Diego, CA (US)

( * ) Notice: Subject to any disclaimer, the term of this patent is extended or adjusted under 35 U.S.C. 154(b) by 128 days.

(21) Appl. No.: 13/473,067

(22) Filed: May 16, 2012

(65) Prior Publication Data

US 2013/0308549 A1 Nov. 21, 2013

(51) Int. Cl.
*H04J 3/00* (2006.01)
(52) U.S. Cl.
USPC ......... 370/345; 370/235; 455/560.1; 455/434
(58) Field of Classification Search
USPC ......... 370/230, 232, 229, 235, 252, 315, 338, 370/345; 455/9, 517, 450, 456.6
See application file for complete search history.

(56) References Cited

U.S. PATENT DOCUMENTS

| 2005/0243794 | A1 | 11/2005 | Yoon et al. |
| 2009/0040985 | A1 | 2/2009 | Barnawi et al. |
| 2009/0111506 | A1* | 4/2009 | Laroia et al. ............... 455/550.1 |
| 2010/0002656 | A1 | 1/2010 | Ji et al. |
| 2010/0124205 | A1 | 5/2010 | Ghanadan et al. |
| 2010/0189048 | A1 | 7/2010 | Baker et al. |
| 2010/0260093 | A1 | 10/2010 | Liu et al. |
| 2011/0103327 | A1 | 5/2011 | Lee et al. |
| 2011/0282989 | A1* | 11/2011 | Geirhofer et al. ............. 709/224 |

FOREIGN PATENT DOCUMENTS

| WO | 2004103009 | 11/2004 |
| WO | 2010097645 A1 | 9/2010 |

OTHER PUBLICATIONS

International Search Report and Written Opinion—PCT/US2013/041418—ISA/EPO—Aug. 26, 2013.

* cited by examiner

*Primary Examiner* — Dady Chery
(74) *Attorney, Agent, or Firm* — James K. O'Hare

(57) ABSTRACT

A wireless communications device supporting peer-to-peer communications acquires peer-to-peer communications resources for an extended period of time. In some embodiments, a base station assigns the resources to the device, while in other embodiments, the device reserves, e.g., self-assigns peer-to-peer communications resources for an extended period of time. The wireless communications device decides that it will not be using an acquired peer-to-peer communications resources, e.g., a particular acquired peer-to-peer traffic segment. The wireless communications device transmits a resource availability indicator indicating that it will not be using the particular peer-to-peer communications resource. Another wireless communications device, which detects the resource availability indicator, may use the peer-to-peer communications resource which is not be used by the device to which it is assigned.

27 Claims, 28 Drawing Sheets

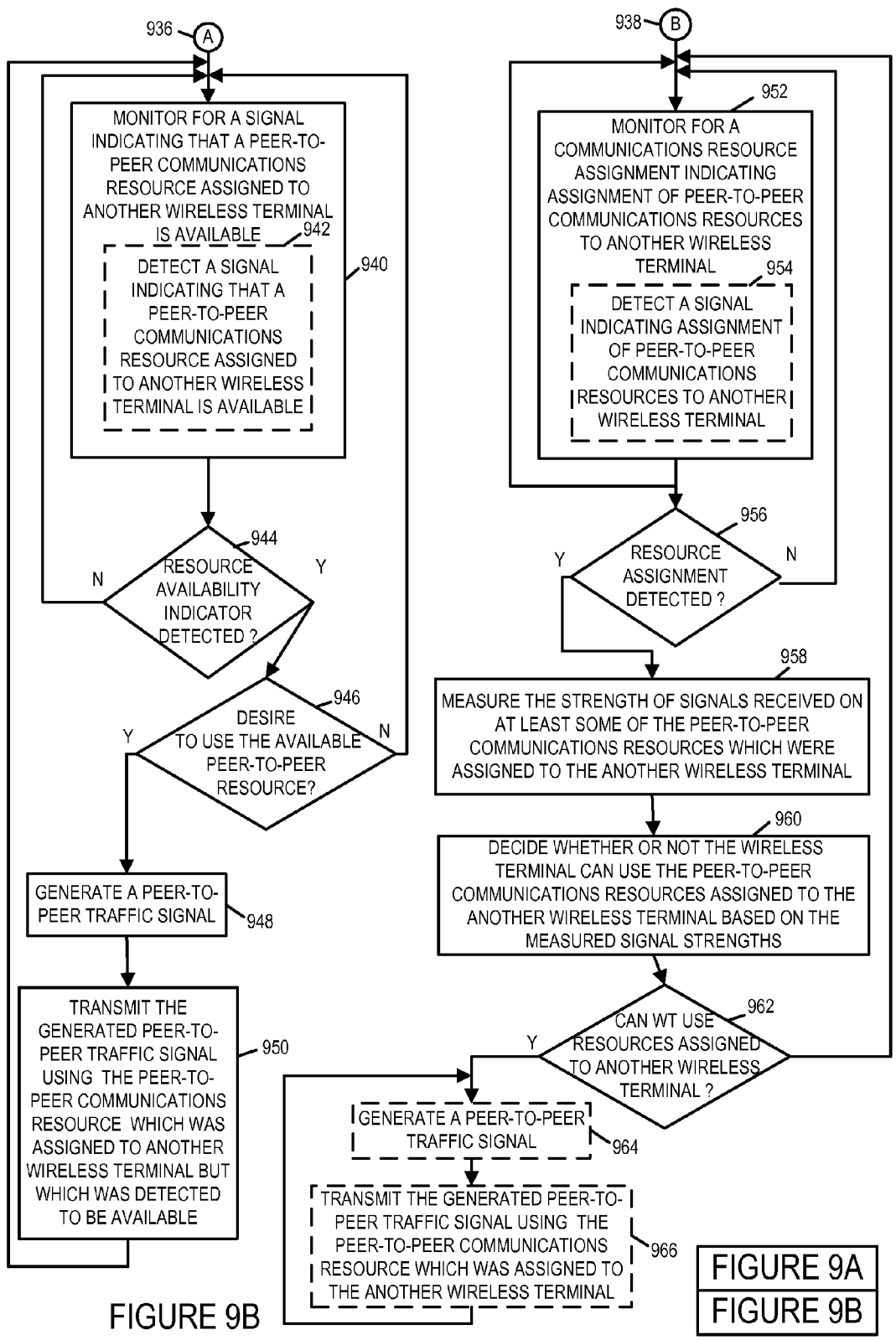

METHODS AND APPARATUS FOR PEER-TO-PEER COMMUNICATIONS RESOURCE SCHEDULING

FIELD

Various embodiments are directed to scheduling for wireless communications, and more particularly to methods and apparatus for semi-persistent and/or persistent scheduling for peer-to-peer communications.

BACKGROUND

In a conventional device-to device (D2D) system, sometimes referred to as a peer-to-peer system, there is significant control overhead incurred for a link to contend for resources. Frequently, a device seeking a resource will have to repeatedly contend for or request a resource during each contention or resource reservation interval preceding a traffic transmission period in which a resource is sought to be used. It would be desirable if methods and/or apparatus for requesting and/or reserving resources could be developed which could reduce signaling overhead without resulting in significant underutilization of resources.

SUMMARY

Various embodiments are directed to methods and apparatus for peer-to-peer communications resource scheduling in a wireless communications system. Some embodiments, are directed to base station assisted approaches, while other embodiments are directed to approaches in which scheduling is performed using a decentralized approach with no involvement from a base station or central control node.

In some embodiments, a base station assigns a requesting wireless terminal peer-to-peer communications resources for an extended period of time. The wireless terminal, which has been assigned the peer-to-peer communications resources may, and sometimes does, relinquish one or more of its assigned peer-to-peer communications resources, e.g., an individual peer-to-peer traffic segment that it does not intend to use. The wireless terminal transmits a resource availability indicator indicating that it will not be using an assigned peer-to-peer communications resource. Another wireless terminal which detects the resource availability indicator may use the assigned resource which is not being used by the device to which it was assigned.

In some embodiments, a peer-to-peer wireless communications device reserves, e.g., self-assigns, peer-to-peer communications resources for an extended period of time. The device which reserved the peer-to-peer communications resources may, and sometimes does, relinquish one or more of its reserved peer-to-peer communications resources, e.g., an individual peer-to-peer traffic segment that it does not intend to use. The device transmits a resource availability indicator indicating that it will not be using a reserved peer-to-peer communications resource. Another peer-to-peer communications device, which detects the resource availability indicator, may use the assigned resource which is not being used by the device to which it was assigned.

An exemplary method of operating wireless terminal in accordance with some embodiments comprises: requesting assignment of peer-to-peer communications resources for a period of time which is at least N times a time period between resource assignment request intervals, N being a positive integer greater than 2; and receiving a peer-to-peer communications resource assignment indicating assignment of resources for an assigned time period which is at least M times a time period between resource request intervals, where M is less than or equal to N. An exemplary wireless terminal, in accordance with some embodiments, comprises: at least one processor configured to: request assignment of peer-to-peer communications resources for a period of time which is at least N times a time period between resource assignment request intervals, N being a positive integer greater than 2; and receive a peer-to-peer communications resource assignment indicating assignment of resources for an assigned time period which is at least M times a time period between resource request intervals, where M is less than or equal to N. The exemplary wireless terminal further comprises memory coupled to said at least one processor.

An exemplary method of operating a peer-to-peer communications device, in accordance with some embodiments, comprises: transmitting a peer-to-peer resource reservation signal reserving peer-to-peer communications resources for a period of time which is at least N times a time period between resource reservation signaling intervals, N being a positive integer greater than 2; refraining from transmitting a resource reservation signal reserving said peer-to-peer resources during said period of time; and using at least some of the reserved peer-to-peer resources during said period of time. An exemplary peer-to-peer communications device, in accordance with some embodiments, comprises: at least one processor configured to: transmit a peer-to-peer resource reservation signal reserving peer-to-peer communications resources for a period of time which is at least N times a time period between resource reservation signaling intervals, N being a positive integer greater than 2; refrain from transmitting a resource reservation signal reserving said peer-to-peer resources during said period of time; and use at least some of the reserved peer-to-peer resources during said period of time. The exemplary peer-to-peer communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 9B is a second part of a flowchart of an exemplary method of operating a wireless terminal in accordance with various exemplary embodiments.

DETAILED DESCRIPTION

Figure 1:
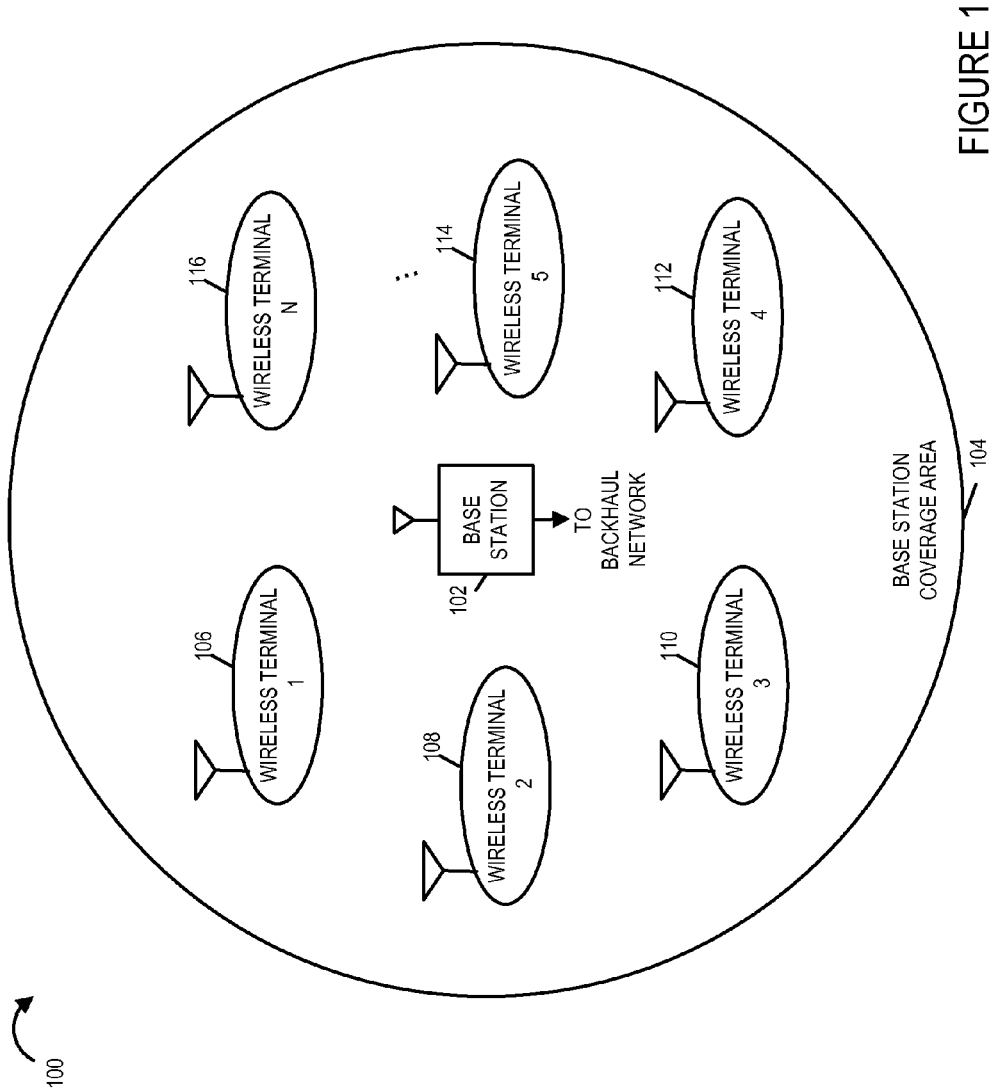
FIG. 1 is a drawing of an exemplary communications system in accordance with an exemplary embodiment.

FIG. 1 is a drawing of an exemplary wireless communications system 100 in accordance with various exemplary embodiments. Exemplary wireless communications system 100 includes a base station 102 with a corresponding base station coverage area 104, and a plurality of wireless terminals (wireless terminal 1 106, wireless terminal 2 108, wireless terminal 3 110, wireless terminal 4 112, wireless terminal 5 114, . . . , wireless terminal N 116. Base station 102 is coupled to a backhaul network. In various embodiments, the system 100 includes other base stations which are also coupled to the backhaul network. The wireless terminals (106, 108, 110, 112, 114, . . . , 116) are, e.g., mobile devices which may move throughout the system 100. The wireless terminals (106, 108, 110, 112, 114, . . . , 116) support uplink and downlink communications with base station 102 and also support direct peer-to-peer communications between wireless terminals which do not traverse the base station.

In various embodiments, a wireless terminal receives a peer-to-peer communications resource assignment for a period of time from a base station. The wireless terminal, assigned the peer-to-peer communications resource for the period of time, may, and sometimes does, relinquish an assigned peer to peer communications resource within the period of time and indicates that it is relinquishing the resource. Another wireless terminal may use the relinquished peer-to-peer communications resource. Thus, in at least some embodiments, the base station makes peer-to-peer communications resource assignments for a large time interval, e.g., including a plurality of time slots, and the wireless terminals further mange the assigned peer-to-peer communications resources among themselves, e.g., at a faster rate of control than the rate of assignment implemented by the base station. For example, wireless terminals make adjustments to the base station assignments, e.g., a first wireless terminal relinquishes a peer-to-peer communications resource for a particular timing slot in a plurality of slots that it was assigned by the base station, which is not needed by the first wireless terminal, and the first wireless terminal signals that it is relinquishing the resource; a second wireless terminal detects that the base station assigned resource has been relinquished and uses the relinquished peer-to-peer communications resources. This approach facilities efficient use of the peer-to-peer communications resources while reducing control signaling overhead than what would otherwise be needed if the entire peer-to-peer resource assignment was under base station control.

Figure 2:
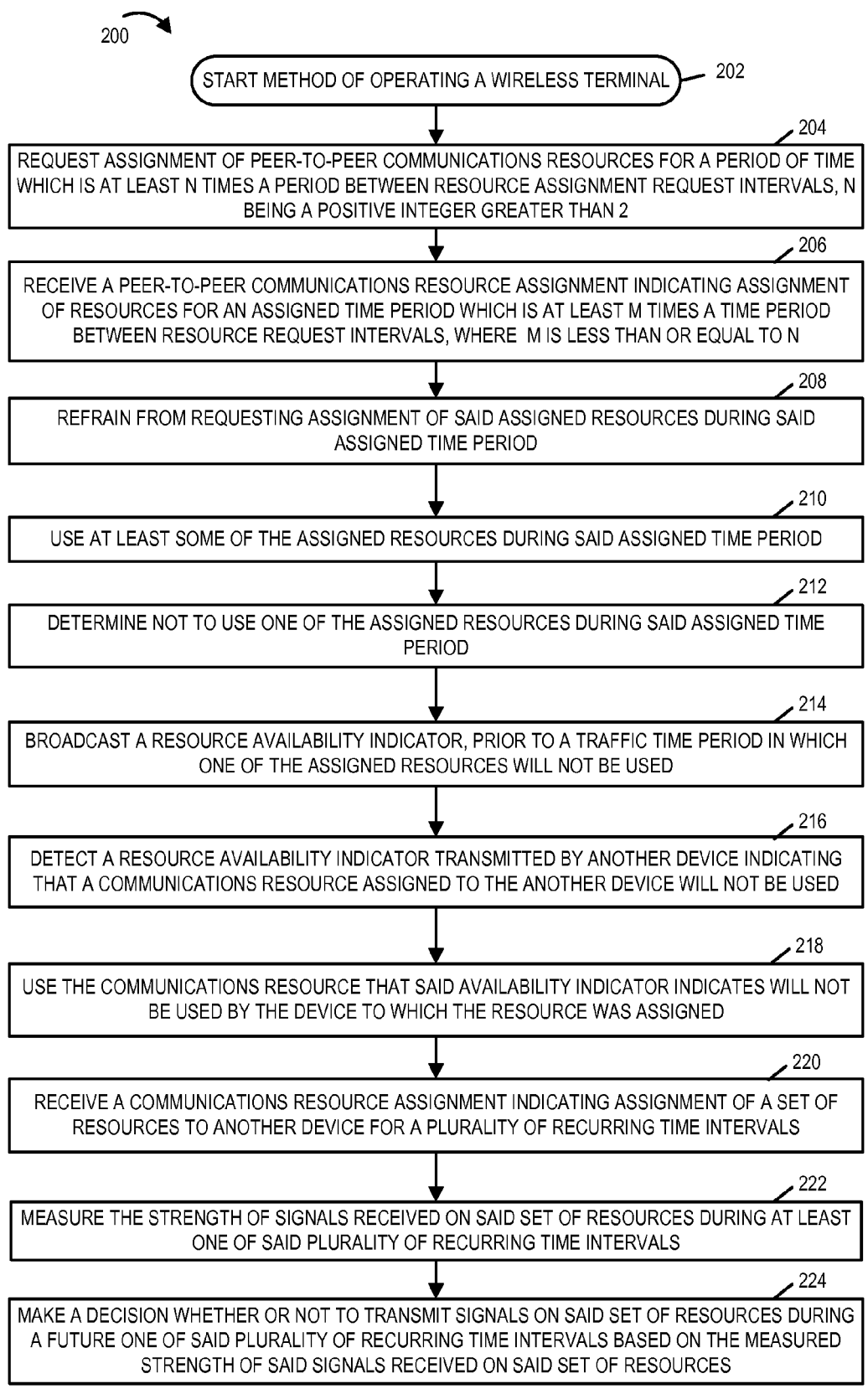
FIG. 2 is a flowchart of an exemplary method of operating a wireless terminal in accordance with various exemplary embodiments.

FIG. 2 is a flowchart 200 of an exemplary method of operating a wireless terminal in accordance with various exemplary embodiments. Operation of the exemplary method starts in step 202, where the wireless terminal is powered on and initialized. Operation proceeds from start step 202 to step 204. In step 204 the wireless terminal requests assignment of peer-to-peer communications resources for a period of time which is at least N times a period between resource assignment request intervals, N being a positive integer greater than 2. Operation proceeds from step 204 to step 206.

In step 206 the wireless terminal receives a peer-to-peer communications resource assignment indicating assignment of resources for an assigned time period which is at least M times a time period between resource request intervals, where M is less than or equal to N. Operation proceeds from step 206 to step 208. In step 208 the wireless terminal refrains from requesting assignment of said assigned resources during said assigned time period. Operation proceeds from step 208 to step 210.

In step 210 the wireless terminal uses at least some of the assigned resources during said assigned time period. Operation proceeds from step 210 to step 212.

In step 212 the wireless terminal determines not to use one of the assigned resources during said assigned time period. Then, in step 214 the wireless terminal broadcasts a resource availability indicator, prior to a traffic time period in which one of the assigned resource will not be used. In some embodiments, the resource availability indicator is a one bit indicator transmitted in a slot of a resource availability channel, said slot having a predetermined known relationship to the one of the assigned resources which will not be used. In various embodiments, the resource availability indicator indicates that the wireless terminal will not use an assigned resource, e.g., an assigned traffic slot. In some embodiments, the resource availability indicator is a one bit flag transmitted on a resource availability indicator control channel prior to the traffic slot to which the indicator corresponds. Operation proceeds from step 214 to step 216.

In step 216 the wireless terminal detects a resource availability indicator transmitted by another device indicating that a communications resource assigned to the another device will not be used. Then, in step 218 the wireless terminal uses the communications resource that said availability indicator indicates will not be used by the device to which the resource was assigned. Thus the wireless terminal can monitor for resources availability indicators transmitted by other device in step 216, and in step 218 the wireless terminal can use an assigned resource of another device which is not being used by the other device to which it was assigned in a particular traffic slot. Operation proceeds from step 218 to step 220.

In step 220 the wireless terminal receives a communications resource assignment indicating assignment of a set of resources to another device for a plurality of recurring time intervals. Operation proceeds from step 220 to step 222. In step 222 the wireless terminal measures the strength of signals received on said set of communications resources during at least one of said plurality of recurring time intervals. Operation proceeds from step 222 to step 224. In step 224 the wireless terminal makes a decision whether or not to transmit signals on said set of resources during a future one of said plurality of recurring time intervals based on the measured strength of said signals received on said set of resources.

In some embodiments, corresponding to the flowchart 200 of FIG. 2, the assignment request of step 204 is directed to a base station, e.g., base station 102, of FIG. 1, and the received peer-to-peer communications resource assignment was transmitted by the base station. Thus in some embodiments, a base station assigns direct peer-to-peer communications resources, sometimes referred to as device to device (D2D) communications resources, for extended periods of time to a wireless terminal within its coverage area. In some embodiments, N in step 204 and M in step 206 are used to indicate time periods exceeding the amount of time between request opportunities, i.e., a persistent assignment.

Figure 3:
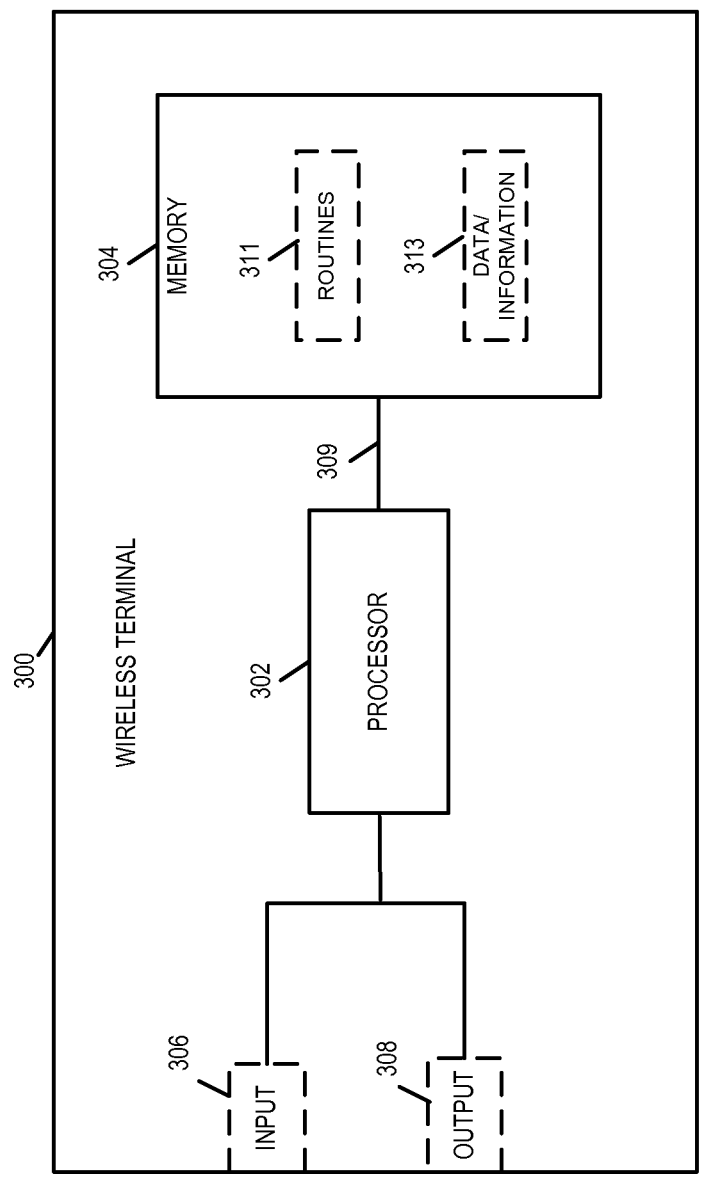
FIG. 3 is a drawing of an exemplary wireless terminal, e.g., a mobile node supporting peer to peer communications and WAN communications, in accordance with an exemplary embodiment.

FIG. 3 is a drawing of an exemplary wireless terminal 300, e.g., a mobile wireless terminal supporting peer-to-peer and WAN signaling, in accordance with an exemplary embodiment. Exemplary wireless terminal 300 is, e.g., one of the wireless terminals of system 100 of FIG. 1. Exemplary wireless terminal 300 may, and sometimes does, implement a method in accordance with flowchart 200 of FIG. 2.

Wireless terminal 300 includes a processor 302 and memory 304 coupled together via a bus 309 over which the various elements (302, 304) may interchange data and information. Wireless terminal 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In some embodiments processor 302 is configured to: request assignment of peer-to-peer communications resources for a period of time which is at least N times a time period between resource assignment request intervals, N being a positive integer greater than 2. In some such embodiments, processor 302 is further configured to receive a peer-to-peer communications resource assignment indicating assignment of resources for an assigned time period which is at least M times a time period between resource request intervals, where M is less than or equal to N.

Processor 302, in various embodiments, is further configured to: refrain from requesting assignment of said assigned resources during said assigned time period; and use at least some of the assigned resources during said assigned time period. In some embodiments, processor 302 is further configured to: determine not to use one of the assigned resources during said assigned time period; and broadcast a resource availability indicator, prior to a traffic time period in which said one of the assigned resources will not be used. In some such embodiments, the resource availability indicator is a one bit indicator transmitted in a slot of a resource availability channel, said slot having a predetermined known relationship to the one of the assigned resources which will not be used.

In various embodiments, processor 302 is further configured to: detect a resource availability indicator transmitted by another device indicating that a communications resource assigned to the another device will not be used; and use the communications resource that said availability indicator indicates will not be used by the device to which the resource was assigned.

Processor 302, in some embodiments, is further configured to: receive a communications resource assignment indicating assignment of a set of resources to another device for a plurality of recurring time intervals; measure the strength of signals received on said set of resources during at least one of said plurality of recurring time intervals; and make a decision whether or not to transmit peer-to-peer signals on said set of resources during a future one of said plurality of recurring time intervals based on the measured strength of said signals received on said set of resources.

Figure 4:
FIG. 4 is an assembly of modules which can, and in some embodiments is, used in the exemplary first wireless terminal illustrated in FIG. 3.

FIG. 4 is an assembly of modules 400 which can, and in some embodiments is, used in the first wireless terminal 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless terminal 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless terminal 300 or elements therein such as the processor 302, to perform the functions of the corresponding steps illustrated and/or described in the method of flowchart 200 of FIG. 2.

Assembly of modules 400 includes a module 404 for requesting assignment of peer-to-peer communications resources for a period of time which is at least N times a period between resource assignment request intervals, N being a positive integer greater than 2, and a module for receiving a peer-to-peer communications resource assignment indicating assignment of resources for an assigned time period which is at least M times a period between resource request intervals, where M is less than or equal to N 406. Assembly of modules 400 further includes a module for refraining from requesting assignment of said assigned resources during said assigned time period 408, a module for using at least some of the assigned resources during said assigned time period 410, a module for determining not to use one of the assigned resources during said assigned time period 412 and a module for broadcasting a resource availability indicator prior to a traffic time period in which one of the assigned resources will not be used 414.

Assembly of modules 400 further includes a module for detecting a resource availability indicator transmitted by another device indicating that a communications resource assigned to said another device with not be used 416 and a module for using the communications resources that said availability indicator indicates will not be used by the device to which the resource was assigned 418. Assembly of modules 400 further includes a module for receiving a communications resource assignment indicating assignment of a set of resources to another device for a plurality of recurring time intervals 420, a module for measuring the strength of signals received on said set of resources during at least one of said plurality of recurring time intervals 422 and a module for making a decision whether or not to transmit signals on said set of resources during a future one of said plurality of recurring time intervals based on the measured strength of said signal received on said set of resources 424.

Figure 5:
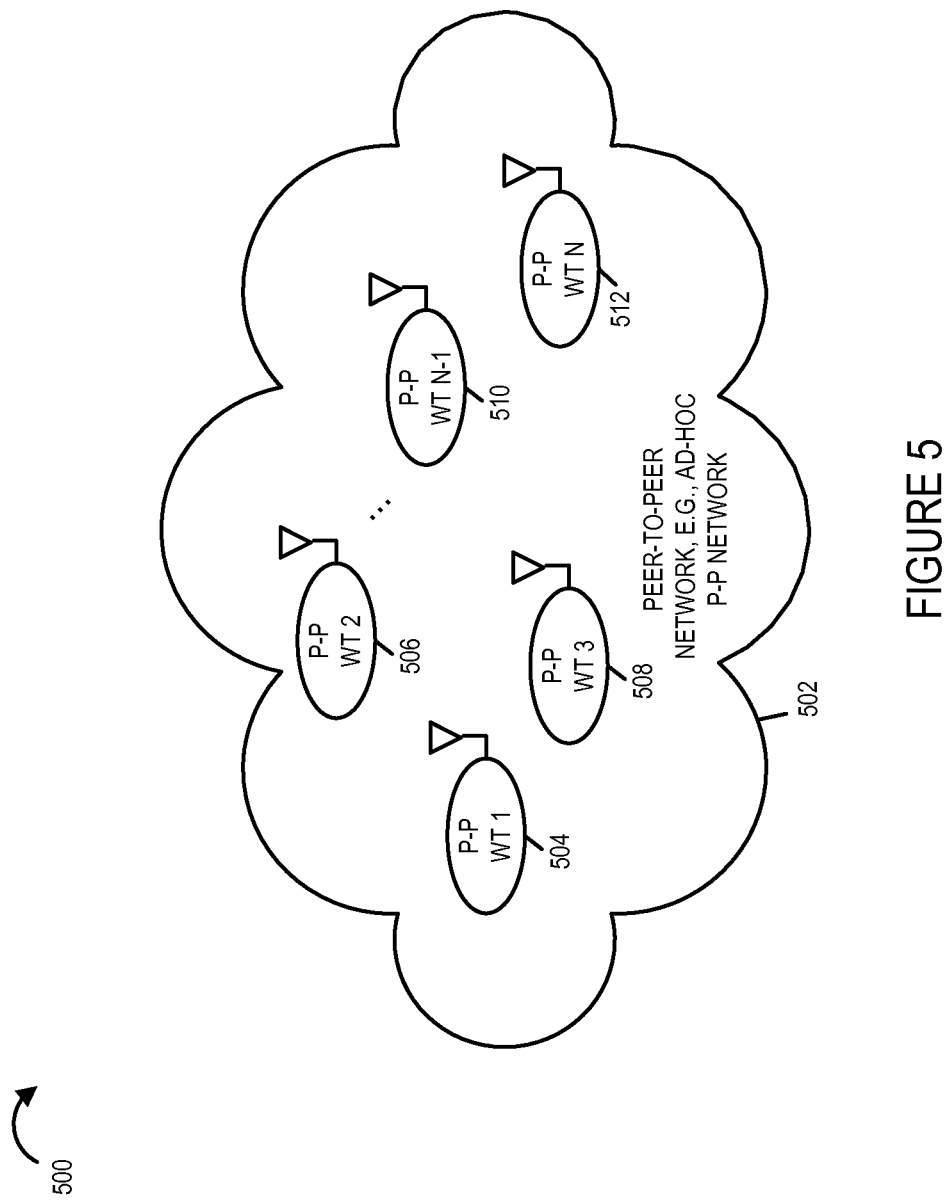
FIG. 5 is a drawing of an exemplary peer-to-peer network in accordance with an exemplary embodiment.

FIG. 5 is a drawing of an exemplary peer-to-peer network 500, e.g., an ad-hoc peer-to-peer network, in accordance with various exemplary embodiments. Exemplary peer-peer network 500 includes a plurality of peer-to-peer communications devices (peer-to-peer wireless terminal 1 504, peer-to-peer wireless terminal 2 506, peer-to-peer wireless terminal 3 508, peer-to-peer wireless terminal N-1 510, peer-to-peer wireless terminal N 512). A peer-to-peer communications device, e.g., device 504, may, and sometimes does, transmit a resource reservations signal reserving peer to peer communications resources for a peer of time. During that period of time, the communications device may, and sometimes does, subsequently use at least some of the resources that it has reserved. During that period of the communications device which has reserved resources, may, and sometimes does decide not to use one of the reserved resources during the reserved time period, and the device generates and broadcasts a resource availability indicator indicating that it has relinquished a resource. For example, during one particular traffic slot the device which has reserved the resource may have determined that it has no peer-to-peer traffic signals to communicate, and thus the device transmits the resource availability indicator prior to the traffic slot so that another device may use the peer to peer communications resource and the resource will not be wasted. Another device, e.g., device 510, which detects the transmitted resource availability indicator may use the communications resource which it not reserved but has detected to have been temporarily relinquished.

Thus a peer-to-peer communications device may, and sometimes does, self-reserve a set of peer-to-peer communications resources, e.g., for a relatively long time interval. Then, during the reserved time interval, the device may, and sometimes does, decide not to use some of the reserved resources, and the device transmits a resource availability indicator so that other peer to peer communications devices may be made aware of the temporarily available resources and make use of the resources.

Figure 6:
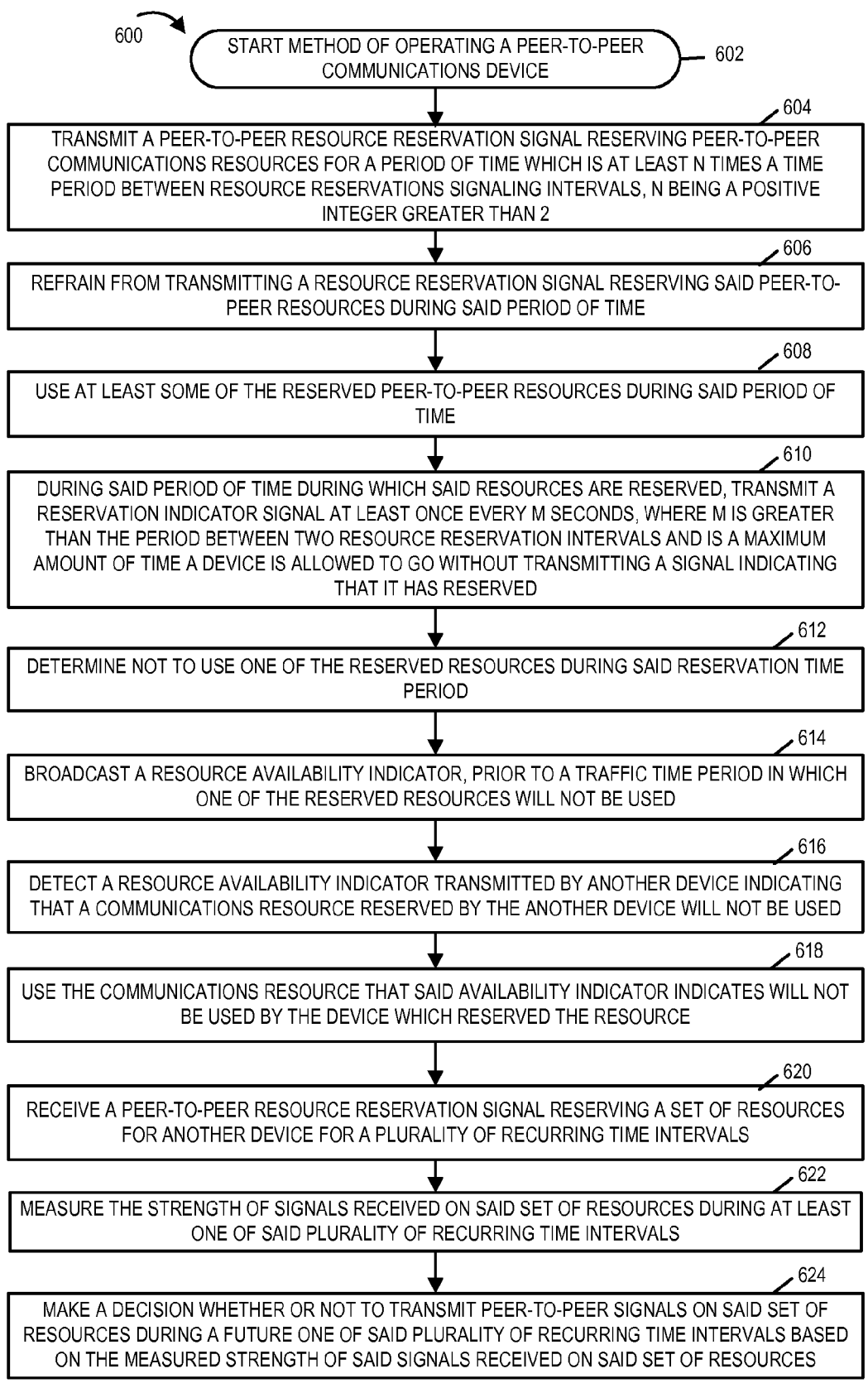
FIG. 6 is a flowchart of an exemplary method of operating a peer-to-peer communications device in accordance with various exemplary embodiments.

FIG. 6 is a flowchart 600 of an exemplary method of operating a peer-to-peer communications device in accordance with various exemplary embodiments. The peer-to-peer communications device implementing the method of FIG. 6 is one of peer-to-peer mobile wireless communications devices of system 500 of FIG. 5, e.g., peer-to-peer wireless terminal 502. In various embodiments in accordance with flowchart 600 there is persistent or semi-persistent assignment of peer-to-peer communications resources without base station involvement, e.g., self-assignment or reservation of a set of peer-to-peer communications resources by the peer-to-peer communications device. Operation starts in step 602 where the peer-to-peer communications device is powered on and initialized. Operation proceeds from start step 602 to step 604.

In step 604 the peer-to-peer communications device transmits a peer-to-peer resource reservation signal reserving peer-to-peer communications resources for a period of time which is at least N times a time period between resource reservation signaling intervals, N being a positive integer greater than 2. Operation proceeds from step 604 to step 606. In step 606 the peer-to-peer communications device refrains from transmitting a resource reservation signal reserving said peer-to-peer resources during said period of time. Then, in step 608 the peer-to-peer communications device uses at least some of the reserved peer-to-peer resources during said period of time. Operation proceeds from step 608 to step 610.

In step 610, the peer-to-peer communications device, during said period of time which said resources are reserved, transmits a reservation indicator signal at least once every M seconds, where M is greater than the period between two resource reservation intervals and is a maximum amount of time a device is allowed to go without transmitting a signal indicating that it has reserved. Thus the peer-to-peer communications device in step 610 re-signals its reservation, e.g., periodically so that new devices in its vicinity can be informed of the resource reservation. Operation proceeds from step 610 to step 612.

In step 612 the peer-to-peer communications device determines not to use one of the reserved resources during said reservation time period. Then, in step 614 the peer-to-peer communications device broadcast as resource availability indicator, prior to a traffic time period in which one of the reserved resources will not be used. In some embodiments, the resource availability indicator is a one bit indicator transmitted in a slot of a resource availability channel, said slot having a predetermined known relationship to one of the reserved resources which will not be used. In various embodiments, the resource availability indicator indicates that the peer-to-peer communications will not use a reserved resource, e.g., a reserved traffic slot. In some embodiments, the resource availability indicator is a one bit flag transmitted on a resource availability indicator control channel prior to the traffic slot to which the indicator corresponds. Operation proceeds from step 614 to step 616.

In step 616 the peer-to-peer communications device detects a resource availability indicator transmitted by another device indicating that a communications resource reserved by the another device will not be used. Operation proceeds from step 616 to step 618. In step 618 the peer-to-peer communications device uses the communications resources that said availability indicator indicates will not be used by the device which reserve the resource. Thus the peer-to-peer communications device can monitor for resource availability indicators transmitted from other devices and when the peer-to-peer communications device detects a resource availability indicator from another device in step 616, the peer-to-peer communications device can, in step 618, use the reserved resource which is not being used by the another device in the particular traffic slot corresponding to the detected indicator. Operation proceeds from step 618 to step 620.

In step 620 the peer-to-peer communications device receives a peer-to-peer resource reservation signal reserving a set of resources for another device for a plurality of recurring time intervals. Then in step 622 the peer-to-peer communications device measures the strength of signal received on said set of resources during at least one of said plurality of recurring time intervals. Then in step 624 the peer-to-peer communications device makes a decision whether or not to transmit peer-to-peer signals on said set of resources during a future one of said plurality of recurring time intervals based on the measured strength of said signals received on said set of resources. In some embodiments, in step 624 the peer-to-peer communications device estimates the amount of interference that its peer-to-peer transmissions would cause to peer-to-peer traffic communications of the another device which had reserved the peer-to-peer communications resources. In some such embodiments, the decision of step 624 is based on whether or not the estimated interference exceeds a predetermined threshold.

Figure 7:
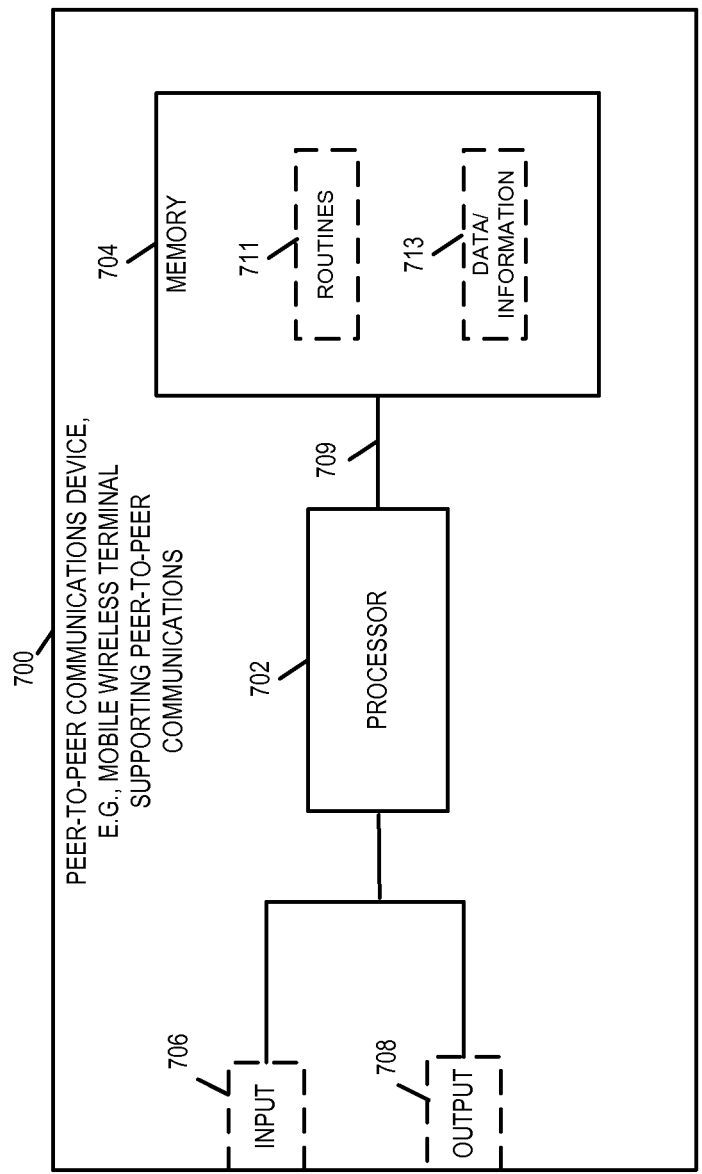
FIG. 7 is a drawing of an exemplary peer-to-peer communications device, e.g., a mobile wireless terminal supporting peer to peer communications, in accordance with an exemplary embodiment.

FIG. 7 is a drawing of an exemplary peer-to-peer communications device, e.g., a mobile wireless terminal supporting direct peer to peer communications sometimes referred to as device to device communications, in accordance with an exemplary embodiment. Exemplary peer-to-peer communications device 700 is, e.g., one of the peer-to-peer wireless terminals of system 500 of FIG. 5. Exemplary peer-to-peer communications device 700 may, and sometimes does, implement a method in accordance with flowchart 600 of FIG. 6.

Communications device 700 includes a processor 702 and memory 704 coupled together via a bus 709 over which the various elements (702, 704) may interchange data and information. Communications device 700 further includes an input module 706 and an output module 708 which may be coupled to processor 702 as shown. However, in some embodiments, the input module 706 and output module 708 are located internal to the processor 702. Input module 706 can receive input signals. Input module 706 can, and in some embodiments does, include a wireless receiver and/or a wired or optical input interface for receiving input. Output module 708 may include, and in some embodiments does include, a wireless transmitter and/or a wired or optical output interface for transmitting output. In some embodiments, memory 704 includes routines 711 and data/information 713.

In some embodiments processor 702 is configured to: transmit a peer-to-peer resource reservation signal reserving peer-to-peer communications resources for a period of time which is at least N times a time period between resource reservation signaling intervals, N being a positive integer greater than 2; refrain from transmitting a resource reservation signal reserving said peer-to-peer resources during said period of time; and use at least some of the reserved peer-to-peer resources during said period of time. In some such embodiments, processor 702 is further configured to: transmit a reservation indicator signal at least once every M seconds during said period of time during which said resources are reserved, where M is greater than the period between two resource reservation intervals and is a maximum amount of time a device is allowed to go without transmitting a signal indicating resources that it has reserved.

In some embodiments, processor 702 is further configured to: determine not to use one of the reserved resources during said reservation time period; and broadcast a resource availability indicator, prior to a traffic time period in which said one of the reserved resources will not be used. In some embodiments, the resource availability indicator is a one bit indicator transmitted in a slot of a resource availability channel, said slot having a predetermined known relationship to the one of the reserved resources which will not be used.

In various embodiments, processor 702 is further configured to: detect a resource availability indicator transmitted by another device indicating that a communications resource reserved by the another device will not be used; and use the communications resource that said availability indicator indicates will not be used by the device which reserved the resource.

Processor 702, in some embodiments, is further configured to: receive a peer-to-peer resource reservation signal reserving a set of resources for another device for a plurality of recurring time intervals; measure the strength of signals received on said set of resources during at least one of said plurality of recurring time intervals; and make a decision whether or not to transmit peer to peer signals on said set of resources during a future one of said plurality of recurring time intervals based on the measured strength of said signals received on said set of resources.

Figure 8:
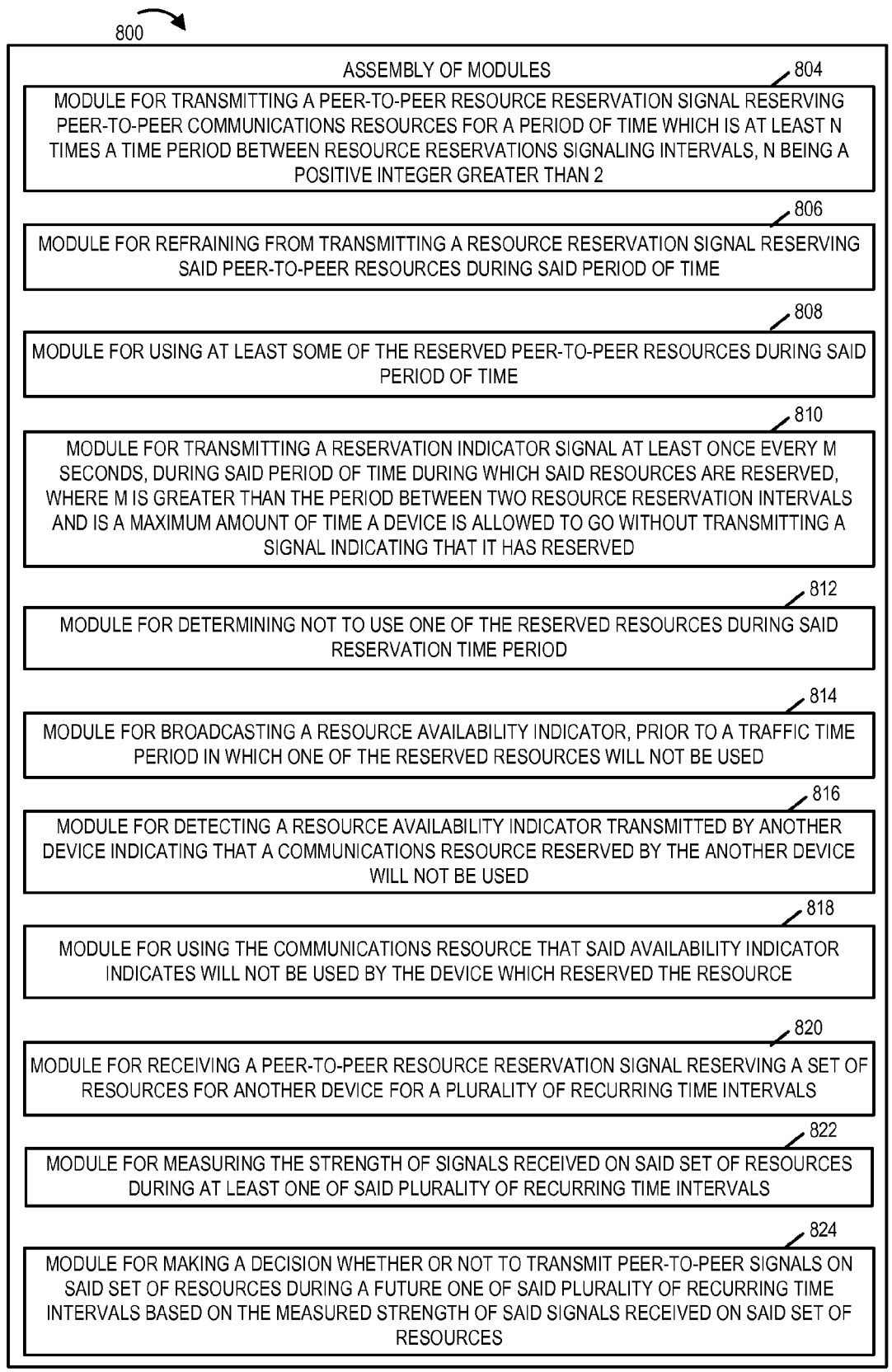
FIG. 8 is an assembly of modules which can, and in some embodiments is, used in the exemplary peer-to-peer communications device illustrated in FIG. 7.

FIG. 8 is an assembly of modules 800 which can, and in some embodiments is, used in the peer-to-peer communications device 700 illustrated in FIG. 7. The modules in the assembly 800 can be implemented in hardware within the processor 702 of FIG. 7, e.g., as individual circuits. Alternatively, the modules may be implemented in software and stored in the memory 704 of communications device 700 shown in FIG. 7. In some such embodiments, the assembly of modules 800 is included in routines 711 of memory 704 of device 700 of FIG. 7. While shown in the FIG. 7 embodiment as a single processor, e.g., computer, it should be appreciated that the processor 702 may be implemented as one or more processors, e.g., computers. When implemented in software the modules include code, which when executed by the processor, configure the processor, e.g., computer, 702 to implement the function corresponding to the module. In some embodiments, processor 702 is configured to implement each of the modules of the assembly of modules 800. In embodiments where the assembly of modules 800 is stored in the memory 704, the memory 704 is a computer program product comprising a computer readable medium, e.g., a non-transitory computer readable medium, comprising code, e.g., individual code for each module, for causing at least one computer, e.g., processor 702, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 8 control and/or configure the peer-to-peer communications device 700 or elements therein such as the processor 702, to perform the functions of the corresponding steps illustrated and/or described in the method of flowchart 600 of FIG. 6.

Assembly of modules 800 includes a module 804 for transmitting a peer-to-peer resource reservation signal reserving peer-to-peer communications resources for a period of time which is at least N times a period of time between resource reservation signaling intervals, N being a positive integer greater than 2, a module for refraining from transmitting a resource reservation signal reserving said peer-to-peer resources during said period of time 806 and a module for using at least some of the reserved peer-to-peer resources during said period of time 808. Assembly of modules 800 further includes a module for transmitting a reservation indicator signal at least once every M seconds during said period of time during which said resources are reserved, where M is greater than the period of time between two resource reservations intervals and is a maximum amount of time a device is allowed to go without transmitting a signal indicating that it has reserved 810, a module for determining not to use one of the reserved resources during said reservation time period 812. Assembly of modules 800 further includes a module for broadcasting a resources availability indicator, prior to a traffic time period in which one of the reserved resources will not be used 814, a module for detecting a resource availability indicator transmitted by another device indicating that a communications resource reserved by the another device will not be used 816 and a module for using the communications resource that said availability indicator indicates will not be used by the device which reserved the resource 818. Assembly of modules 800 further includes a module for receiving a peer-to-peer resource reservation signal reserving a set of resources for another device for a plurality of recurring time intervals 820, a module for measuring the strength of signals received on said set of resources during at least one said plurality of recurring time intervals 822 and a module for making a decision whether or not to transmit peer-to-peer signals on said set of resources during a future one of said plurality of recurring time intervals based on the measured strength of said signals received on said set of resources 824.

Figure 9A:
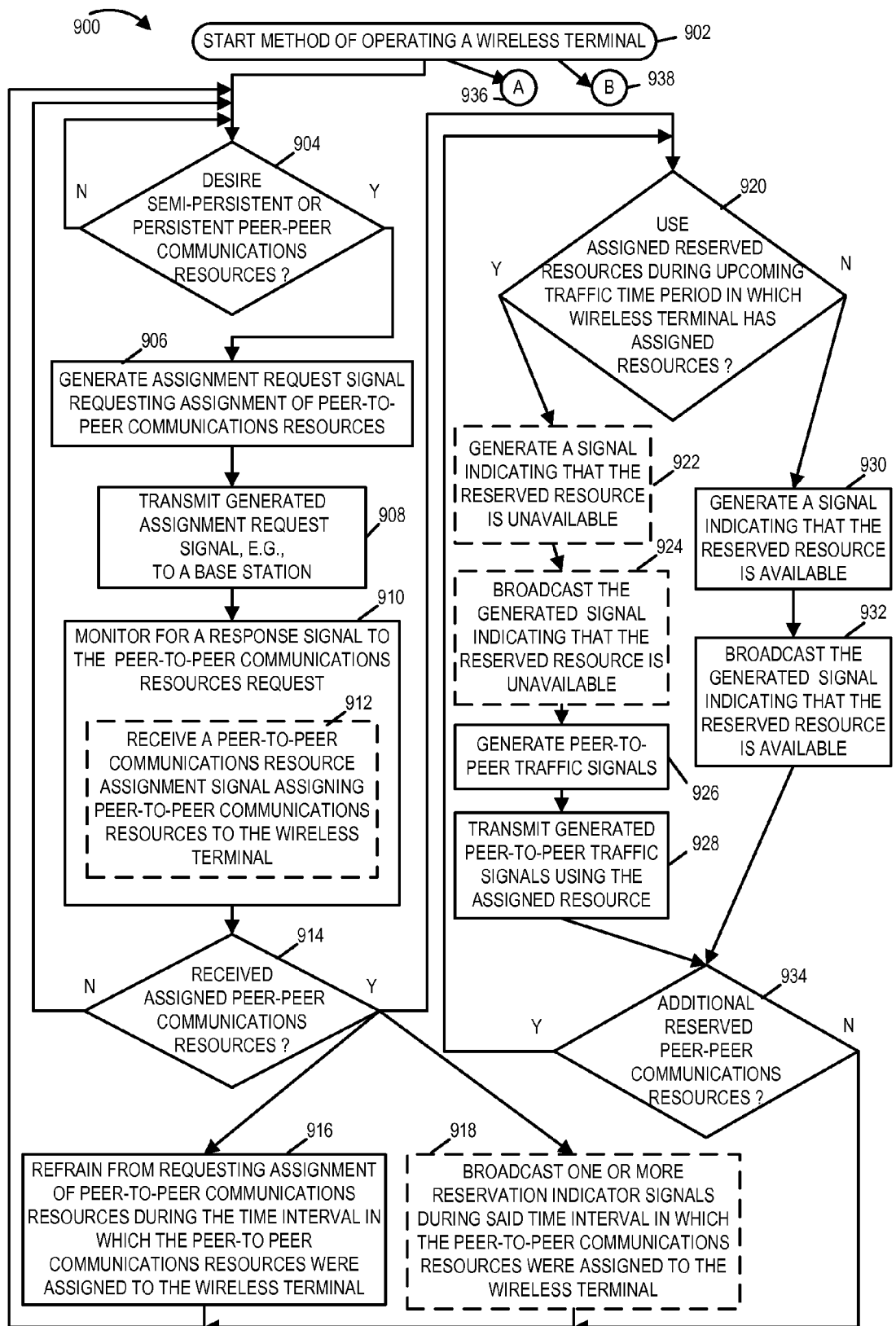
FIG. 9A is a first part of a flowchart of an exemplary method of operating a wireless terminal in accordance with various exemplary embodiments.

FIG. 9, comprising the combination of FIG. 9A and FIG. 9B, is a flowchart 900 of an exemplary method of operating a wireless terminal in accordance with various exemplary embodiments. Operation of the exemplary method starts in step 902 where the wireless terminal is powered on and initialized. Operation proceeds from start step 902 to step 904, to step 940 via connecting node A 936, and to step 952, via connecting node B 938.

Returning to step 904, in step 904 the wireless terminal decides in step 904 if the wireless terminal desires semi-persistent or persistent peer-to-peer communications resources. In some embodiments, the decision of step 904 is made as a function of one or more or all of: an application intended to be run on the wireless terminal, and a type of data intended to be communicated. If the wireless terminal decides in step 904 that it would like semi-persistent of persistent peer-to-peer communications resources to be assigned to the wireless terminal, then operation proceeds from step 904 to step 906; otherwise operation proceeds from the output to step 904 to the input of step 904.

Returning to step 906, in step 906 the wireless terminal generates an assignment request signal requesting assignment of semi-persistent or persistent peer-to-peer communications resources. Then, in step 908 the wireless terminal transmits the generated assignment request signal to a base station or another network node controlling assignment of peer-to-peer communications resources. In some embodiments, the requested assignment of step 906 and 908 is a request for assignment of peer-to-peer communications resources for a period of time which is at least N times a time period between resource assignment request intervals, where N is a positive integer greater than 2. Operation proceeds from step 908 to step 910.

In step 910 the wireless terminal monitors for a response signal to the peer-to-peer communications resource request. Step 910 may, and sometimes does include step 912 in which the wireless terminal receives a peer-to-peer communications resource assignment signal assigning peer-to-peer communications resources to the wireless terminal. In some embodiments, the received peer-to-per communications resource assignment of step 912 indicates assignment of resources for an assigned period of time which is at least M times a time period between resource assignment request intervals, where M is less than or equal to N. Operation proceeds from step 910 to step 914.

In step 914 the wireless terminal determines if it has received assigned peer-to-peer communications resources. If the wireless terminal determines that it has not received assigned peer-to-peer communications resources in response to its request, then operation proceeds from step 914 to the input of step 904. However, if the wireless terminal determines that it has received peer-to-peer communications resources in response to its request, then operation proceeds from step 914 to step 916 and 920, and in some embodiments, to step 918. In step 914 the wireless terminal refrains from requesting assignment of peer-to-peer communications resources during the time interval in which the peer-to-peer communications resources were assigned to the wireless terminal. In optional step 918 the wireless terminal broadcasts one or more reservation indicator signals during said time interval in which the peer-to-peer communications resources were assigned to the wireless terminal.

In step 920 the wireless terminal decides if the wireless terminal intends to use assigned reserved peer-to-peer communications resources during the upcoming peer-to-peer traffic time period in which the wireless terminal has assigned peer-to-peer communications resources. If the wireless terminal decides that it intends to use its assigned peer-to-peer communications resource during the upcoming traffic period then, operation proceeds from step 920 to step 922 or to step 926 depending on the embodiment. In some embodiments, step 922 and 924 are included and performed, while in other embodiments, steps 922 and 924 are omitted and bypassed. However, if the wireless terminal decides that it does not intend to use its assigned peer-to-peer communications resource during the upcoming traffic time period, then operation proceeds from step 920 to step 930. Thus if operation proceeds from step 920 to step 930 the wireless terminal has determined not to use one of its assigned resources during the assigned time period.

Returning to step 922, in step 922 the wireless terminal generates a signal indicating that the reserved resource is unavailable. Then, in step 924 the wireless terminal broadcasts the generated signal indicating that the reserved resource is unavailable. Operation proceeds from step 924 to step 926, in which the wireless terminal generates peer-to-peer traffic signals, and in step 928 the wireless terminal transmits the generated peer-to-peer traffic signal using the assigned reserved peer-to-peer communications resource. In step 928 the wireless terminal is using some of its assigned resources during the assigned time period. Operation proceeds from step 928 to step 934.

Returning to step 930, in step 930 the wireless terminal generates a signal indicating the reserved peer-to-peer communications resource is available, e.g., the signal communicates an indication the wireless terminal does not intend to use its assigned reserved peer-to-peer communications resource during this upcoming traffic time interval. Operation proceeds from step 930 to step 932 in which the wireless terminal broadcasts the generated signal indicating the reserved peer-to-peer communications resource is available. Thus in step 932 the wireless terminal broadcasts a resource availability indicator prior to a traffic time period in which one of the assigned resources will not be used. In some embodiments, the resource availability indicator is a one bit indicator transmitted in a slot of a resource availability channel, said slot having a predetermined known relationship to one of the assigned resources which will not be used. Operation proceeds from step 932 to step 934.

In step 934 the wireless terminal determines if there are additional reserved peer-to-peer communications resources that have been assigned to the wireless terminal, e.g., the wireless terminal determines whether or not its assignment of peer-to-peer communications resources has ended. In some embodiments, the assignment of peer-to-peer communications resource was based on time. In some embodiments, the assignment of peer-to-peer communications resources is based on a number of slots, e.g., a number of peer-to-peer traffic slots. In some embodiments, the assignment of peer-to-peer communications resources includes a set of traffic slots in a predetermined recurring peer-to-peer recurring timing structure for a specified period of time. If the wireless terminal determines in step 934 that there are additional reserved peer-to-peer communications resources which have been assigned to the wireless terminal then, operation proceeds from step 934 to step 920. However, if the wireless terminal determines that there are not any more additional reserved peer-to-peer communications resources assigned to the wireless terminal, then operation proceeds from step 934 to step 904.

Retuning to step 940, in step 940 the wireless terminal monitors for a signal indicating that a peer-to-peer communications resource assigned to another wireless terminal is available. Step 940 may, and sometimes does, includes step 942 in which the wireless terminal detects a signal indicating that a peer-to-peer communications resource assigned to another wireless terminal is available. The signal detected by the wireless terminal was transmitted, e.g., broadcast, by the another wireless terminal to which the peer-to-peer communications resource was assigned. The signal indicates that the another wireless terminal is not using its assigned peer-to-peer communications resource for an upcoming peer-to peer traffic time interval. Thus the signal communicates a resource availability indicator. Therefore, in step 942 the wireless terminal detects a resource availability indicator transmitted by another device indicating that the communications resource assigned to the another device will not be used. Operation proceeds from step 940 to step 944.

In step 944 the wireless terminal determines if a resource availability indicator was detected and controls operation as a function of the determination. If a resource availability indicator was detected, then operation proceeds from step 944 to step 946; otherwise operation proceeds from step 944 to step 940.

Returning to step 946, in step 946 the wireless terminal determines whether or not it desires to use the available peer-to-peer communications resource corresponding to the detected availability indicator, e.g., does the wireless terminal have queued peer-to-peer traffic data that it would like to communicate in the peer-to-peer communications resource that has been identified as not to be used by the device to which it was assigned. If the wireless terminal decides that it does not desire to use the available peer-to-peer communications resource then operation proceeds from step 946 to step 940. However, if the wireless terminal decides that it intends to use the identified available peer-to-peer communications resource, then operation proceeds from step 946 to step 948. In step 948 the wireless terminal generates a peer-to-peer traffic signal and in step 950 the wireless terminal transmits the generated peer-to-peer traffic signal using the peer-to-peer communications resource which was assigned to another wireless terminal but which was detected to be available, e.g., detected that it will not be used by the wireless terminal to which it was assigned. Thus in step 950 the wireless terminal uses the communications resource that the availability indicator detected in step 942 indicates will not be used by the device to which the resource was assigned. Operation proceeds from step 950 to step 940.

Returning to step 952, in step 952 the wireless terminal monitors for a communications resource assignment indicating assignment of peer-to-peer communications resources to another wireless terminal. In various embodiments, the assignments are assignments of semi-persistent or persistent peer-to-peer communications resources by a base station or other network node. Step 952, which is performed on an ongoing basis may, and sometimes does, include step 954 in which the wireless terminal detects a signal indicating assignment of peer-to-peer communications resources to another wireless terminal. In some embodiments step 954 includes receiving a communications resource assignment indicating assignment of a set of resources to another device, e.g., another wireless terminal, for a plurality of recurring time intervals.

Operation proceeds from step 952 to step 956. If a resource assignment has been detected in the monitoring of step 952, then operation proceeds from step 956 to step 958. In step 958 the wireless terminal measures the strength of signals received on at least some of peer-to-peer communications resources which are assigned to the another wireless terminal. Then, in step 960, the wireless terminal decides whether or not the wireless terminal can use the peer-to-peer communications resources assigned to the another wireless terminal based on the measured signal strengths. In some embodiments, the decision of step 960 is based on the estimated interference that peer-to-peer transmission by the wireless terminal on the resource assigned to the other wireless terminal will cause to peer-to-peer communications being performed by the another wireless terminal on its assigned resources. For example, if the wireless terminal determines that its estimated interference is below a predetermined threshold, in some embodiments, it is allowed to concurrently use the peer-to-peer communications resource assigned to the another wireless terminal. In some embodiments, in step 960 the wireless terminal is making a decision whether or not to transmit on the set of resources corresponding to the detected assignment of step 954 during a future one of said plurality of recurring time intervals based on the measured strengths of the signals received on the set of resources.

In step 962, if the wireless terminal has decided that it is allowed to use the peer-to-peer communications resources assigned to the another wireless terminal, then operation proceeds from step 962 to step 964; otherwise, operation proceeds from step 962 to step 952. Returning to step 964 in step 964 the wireless terminal generates a peer-to-peer traffic signal and in step 966 the wireless terminal transmits the generated peer-to-peer traffic signal using the peer-to-peer communications resource which was assigned to the another wireless terminal. Step 964 and 966 may be, and sometimes are, repeated while there are still the peer-to-peer communications resources assigned to the another wireless terminal and while the wireless terminal has peer-to-peer traffic data that it would like to communicate.

Figure 10:
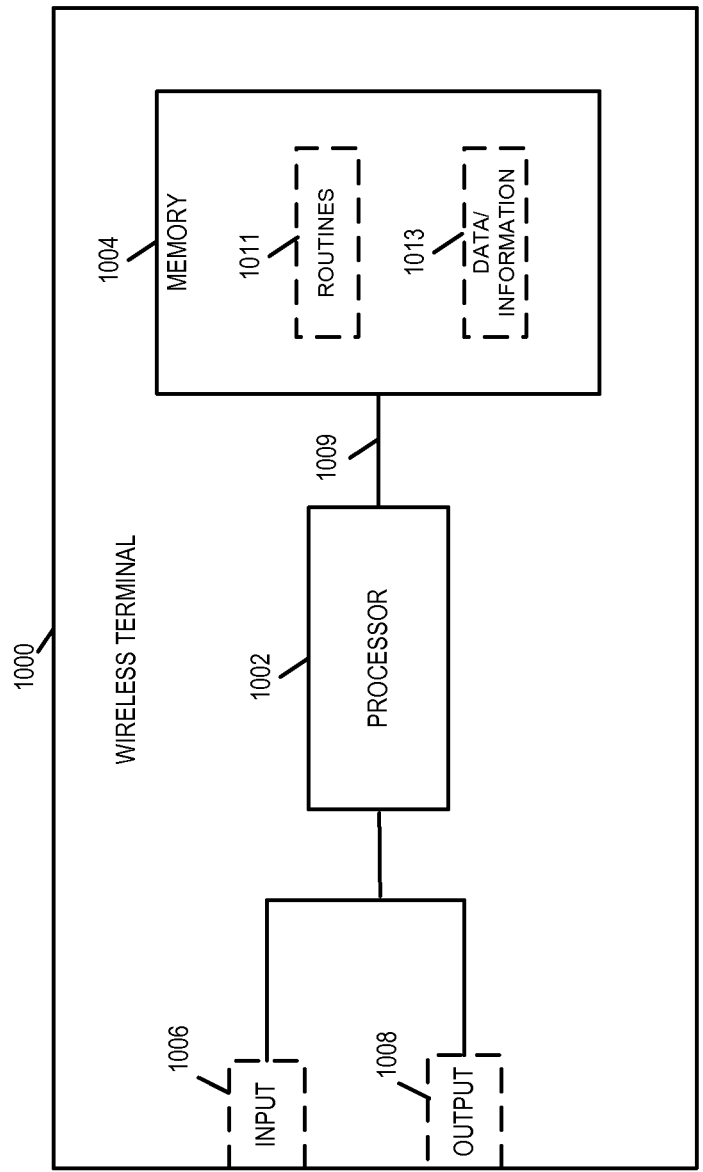
FIG. 10 is a drawing of an exemplary wireless terminal, e.g., a mobile node supporting peer-to-peer communications and WAN communications, in accordance with an exemplary embodiment.

FIG. 10 is a drawing of an exemplary wireless terminal 1000, e.g., a mobile wireless terminal supporting peer-to-peer and WAN signaling, in accordance with an exemplary embodiment. Exemplary wireless terminal 1000 is, e.g., one of the wireless terminals of system 100 of FIG. 1. Exemplary wireless terminal 1000 may, and sometimes does, implement a method in accordance with flowchart 900 of FIG. 9.

Wireless terminal 1000 includes a processor 1002 and memory 1004 coupled together via a bus 1009 over which the various elements (1002, 1004) may interchange data and information. Wireless terminal 1000 further includes an input module 1006 and an output module 1008 which may be coupled to processor 1002 as shown. However, in some embodiments, the input module 1006 and output module 1008 are located internal to the processor 1002. Input module 1006 can receive input signals. Input module 1006 can, and in some embodiments does, include a wireless receiver and/or a wired or optical input interface for receiving input. Output module 1008 may include, and in some embodiments does include, a wireless transmitter and/or a wired or optical output interface for transmitting output. In some embodiments, memory 1004 includes routines 1011 and data/information 1013.

Figure 11A:
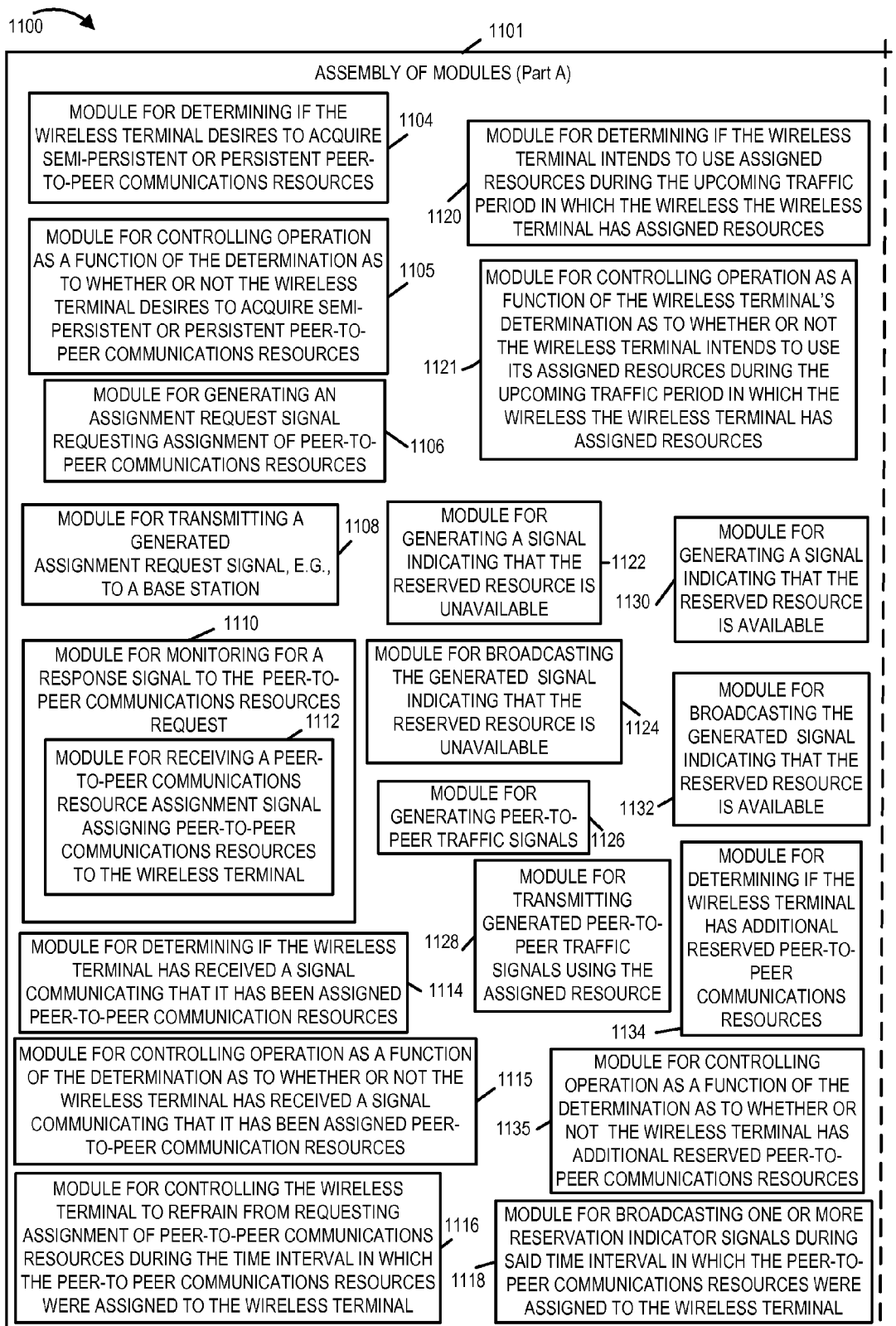
FIG. 11A is a first portion of an assembly of modules which can, and in some embodiments is, used in the exemplary first wireless terminal illustrated in FIG. 10.
Figures 11, 11B:
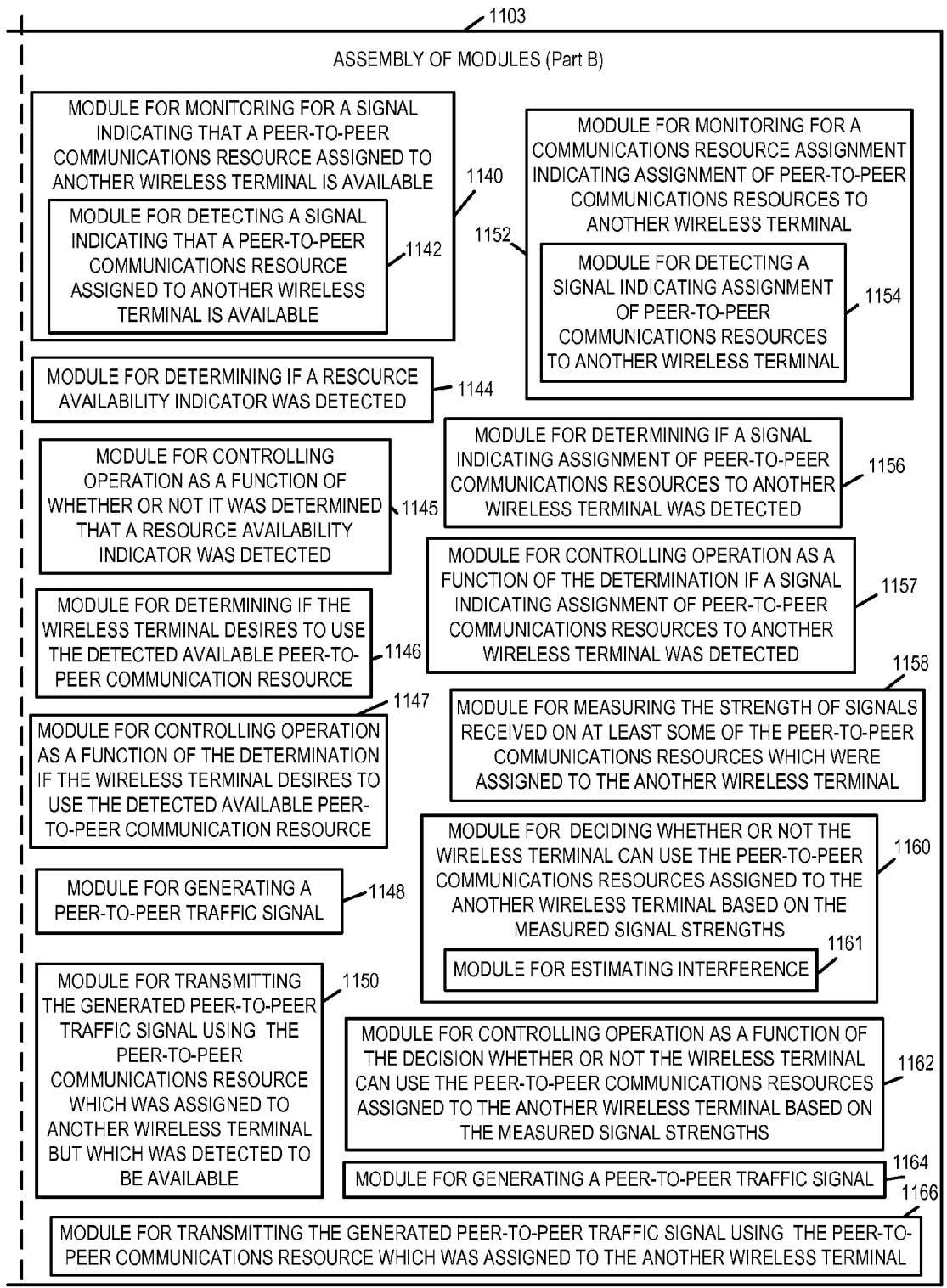
FIG. 11B is a second portion of an assembly of modules which can, and in some embodiments is, used in the exemplary first wireless terminal illustrated in FIG. 10.

FIG. 11 is an assembly of modules 1100 which can, and in some embodiments is, used in the first wireless terminal 1000 illustrated in FIG. 10. The modules in the assembly 1100 can be implemented in hardware within the processor 1002 of FIG. 10, e.g., as individual circuits. Alternatively, the modules may be implemented in software and stored in the memory 1004 of wireless terminal 1000 shown in FIG. 10. In some such embodiments, the assembly of modules 1100 is included in routines 1011 of memory 1004 of device 1000 of FIG. 10. While shown in the FIG. 10 embodiment as a single processor, e.g., computer, it should be appreciated that the processor 1002 may be implemented as one or more processors, e.g., computers. When implemented in software the modules include code, which when executed by the processor, configure the processor, e.g., computer, 1002 to implement the function corresponding to the module. In some embodiments, processor 1002 is configured to implement each of the modules of the assembly of modules 1100. In embodiments where the assembly of modules 1100 is stored in the memory 1104, the memory 1104 is a computer program product comprising a computer readable medium, e.g., a non-transitory computer readable medium, comprising code, e.g., individual code for each module, for causing at least one computer, e.g., processor 1102, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 11 control and/or configure the wireless terminal 1000 or elements therein such as the processor 1002, to perform the functions of the corresponding steps illustrated and/or described in the method of flowchart 900 of FIG. 9.

Assembly of modules 1100, comprising the combination of part A 1101 and part B 1103, includes a module 1104 for determining if the wireless terminal desires to acquire semi-persistent or persistent peer-to-peer communications resources 1104, a module for controlling operation as a function of the determination as to whether or not the wireless terminal desires to acquire semi-persistent of persistent peer-to-peer communications resources 1105, a module for generating an assignment request signal requesting assignment of peer-to peer communications resources 1106, a module for transmitting a generated assignment request signal to a base station or other network node 1108, and a module for monitoring for a response signal to the peer-to-peer communications resource request 1110. Module 1110 includes a module for receiving a peer-to-peer communications resource assignment signal assigning peer-to-peer communications resources to the wireless terminal 1112. Assembly of modules 1100 further includes a module for determining if the wireless terminal has received a signal communicating that it has been assigned peer-to-peer communications resources 1114, a module for controlling operation as a function of the determination as to whether or not the wireless terminal has received a signal communicating that it has been assigned peer-to-peer communications resources 1115, a module for controlling the wireless terminal to refrain from requesting assignment of peer-to-peer communications resources during the time interval in which the peer-to-peer communications resources were assigned to the wireless terminal 1116, and a module for broadcasting one or more reservation indicator signals during said time interval in which the peer-to-peer communications resources were assigned to the wireless terminal 1118.

Assembly of modules 1100 further includes a module for determining if the wireless terminal intends to use its assigned peer-to-peer communications resources during the upcoming traffic time period in which the wireless terminal has assigned peer-to-peer communications resources 1120, and a module for controlling operation as a function of the wireless terminal's determination as to whether or not the wireless terminal intends to use its assigned resources during the upcoming traffic time period in which the wireless terminal has assigned resources 1121. A module for generating a signal indicating that the assigned reserved peer-to-peer communications resource is unavailable in response to the wireless terminals determination that it intends to use its assigned resources in the upcoming traffic time interval 1122, a module for broadcasting the generated signal indicating that the reserved resource is unavailable 1124, a module for generating peer-to-peer traffic signals 1126, and a module for transmitting the generated peer-to-peer traffic signals using the assigned resource 1128. Assembly of modules 1100 further includes a module for generating a signal indicating that the assigned reserved resource is available in response to a determination by the wireless terminal that it does not intend to use its assigned reserved peer-to-peer communications resource during the upcoming traffic time interval 1130, and a module for broadcasting the generated signal indicating that the reserved resource is available 1132.

Assembly of modules 1100 further includes a module for determining if the wireless terminal has additional assigned reserved peer-to-peer communications resources that it may use 1134, and a module for controlling operation as a function of the determination as to whether or not the wireless terminal has additional assigned reserved peer-to-peer communications resources 1135.

Assembly of module 1100 further includes a module for monitoring for a signal indicating that a peer-to-peer communications resource assigned to another wireless terminal is available 1140. Module 1140 includes a module for detecting a signal indicating that a peer-to-peer communications resource assigned to another wireless terminal 1142. Assembly of modules 1100 further includes a module for detecting if a resource availability indicator was detected 1144, a module for controlling operation as a function of whether or not it was determined that a resource availability indicator was detected 1145, a module for determining of the wireless terminal desires to use the detected available peer-to-peer communications resource 1146, a module for controlling operation as a function of the determination if the wireless terminal desires to use the detected available peer-to-peer communications resource 1147, a module for generating a peer-to-peer traffic signal 1148, and a module for transmitting the generated peer-to-peer traffic signal using the peer to peer communications resource which was assigned to another wireless terminal but which was detected to be available, e.g., detected that it will not be used by the another wireless terminal to which it was assigned 1150.

Assembly of modules 1100 further includes a module for monitoring for a communications resource assignment indicating assignment of peer-to-peer communications resources to another wireless terminal 1152. Module 1152 includes a module for detecting a signal indicating assignment of peer-to-peer communications resources to another wireless terminal 1154. Assembly of modules 1100 further includes a module for determining if a signal indicating assignment of peer-to-peer communications resources to another wireless terminal was detected 1156, a module for controlling operation as a function of the determination if a signal indicating assignment of peer-to-peer communications resources to another wireless terminal was detected 1157, a module for measuring the strength of signals received on at least some of the peer-to-peer communications resources assigned to the another wireless terminal 1158, a module for deciding whether or not the wireless terminal can use the peer-to-peer communications resources assigned to the another wireless terminal based on the measured signal strengths 1160, a module for controlling operation as a function of the decision whether or not the wireless terminal can use the peer-to-peer communications resources assigned to the another wireless terminal based on the measured signal strengths 1162, a module for generating a peer-to-peer traffic signal 1164 and a module for transmitting the generated peer-to-peer traffic signal using the peer-to-peer communications resource which was assigned to the another wireless terminal 1166. Module 1160 includes a module 1161 for estimating interference that the wireless terminal is expected to cause to the peer-to-peer traffic communications of the another wireless terminal which has been assigned peer-to-peer communications resources if the wireless terminal should concurrently transmit peer-to-peer traffic signals on those same peer-to-peer communications resources.

In some embodiments, module 1108 requests assignment of peer-to-peer communications resources for a period of time which is at least N times a time period between resource assignment request intervals, N being a positive integer greater than 2. In some such embodiments, module 1112 receives a peer-to-peer communications resource assignment indicating assignment of resources for an assigned time period which is at least M times a time period between resource request intervals, where M is less than or equal to N. Module 1116 controls the wireless terminal to refrain from requesting assignment of said assigned resources during said assigned time period. Module 1128 uses an assigned resource during an assigned time period. Module 1120 may, and sometimes does, determine not to use one of the assigned resources during said assigned time period. Module 1132 broadcasts a resource availability indicator, prior to a traffic time period in which said one of the assigned resources will not be used. In some embodiments, the resource availability indicator is a bit indicator transmitted in a slot of a resource availability channel, said slot having a predefined relationship to one of the assigned resources which will not be used. Module 1142 detects a resource availability indicated transmitted by another device indicating that a communications resource assigned to another device will not be used. Module 1150 uses the communications resource that said availability indicator indicates will not be used by the device to which the resource was assigned.

In some embodiments, module 1154 receives a communications resource assignment indicating assignment of a set of resources to another device for a plurality of recurring time intervals. In some such embodiments, module 1158 measures the strength of signals received on said set of resources during at least one of said plurality of recurring time intervals, and module 1160 makes a decision whether or not to transmit peer-to-peer signals on said set of resources during a future one of said plurality of recurring time intervals based on the measured strength of signals received on said set of resources.

Figure 12A:
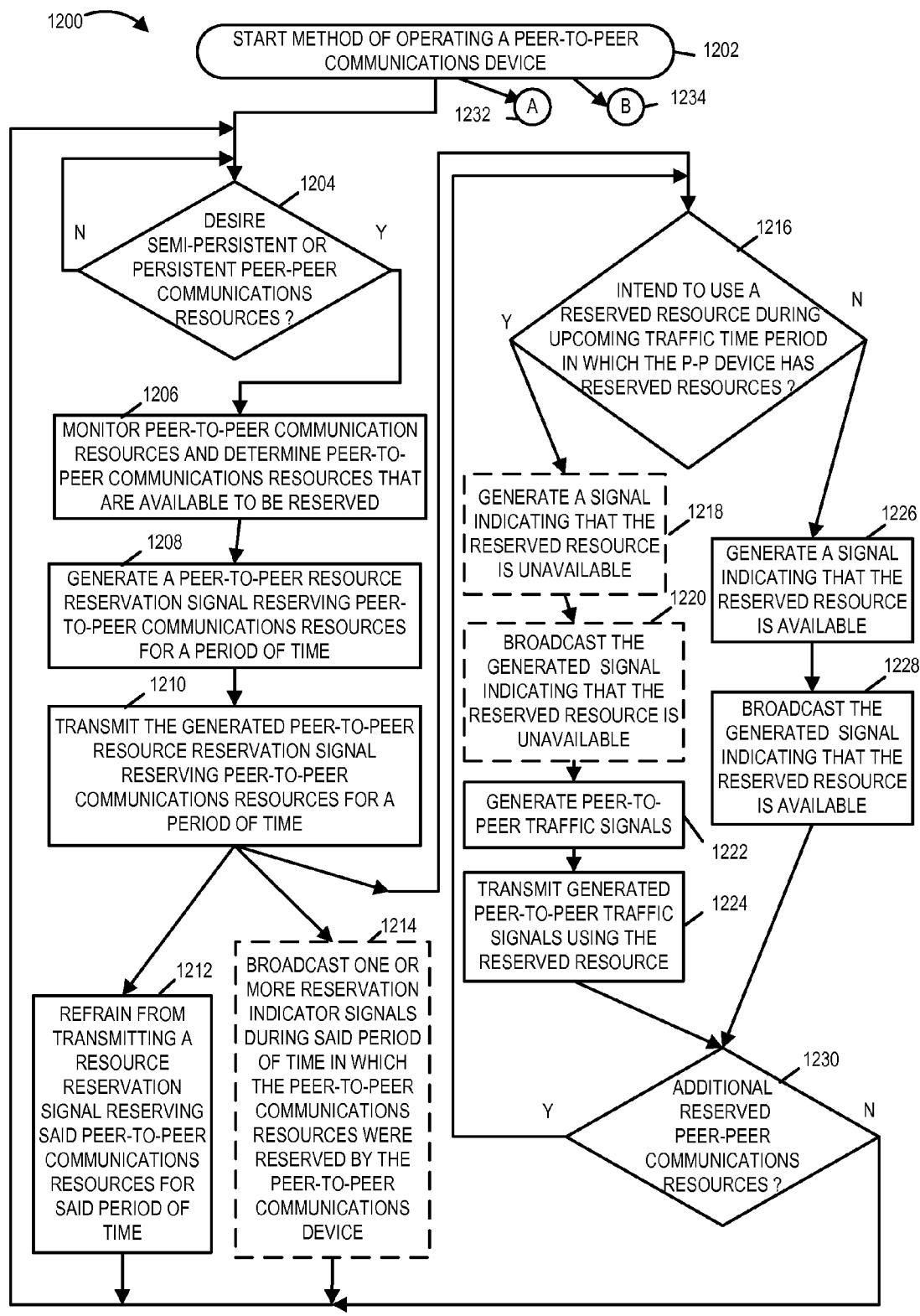
FIG. 12A is a first part is a flowchart of an exemplary method of operating a peer-to-peer communications device in accordance with various exemplary embodiments.
Figures 12, 12A, 12B:
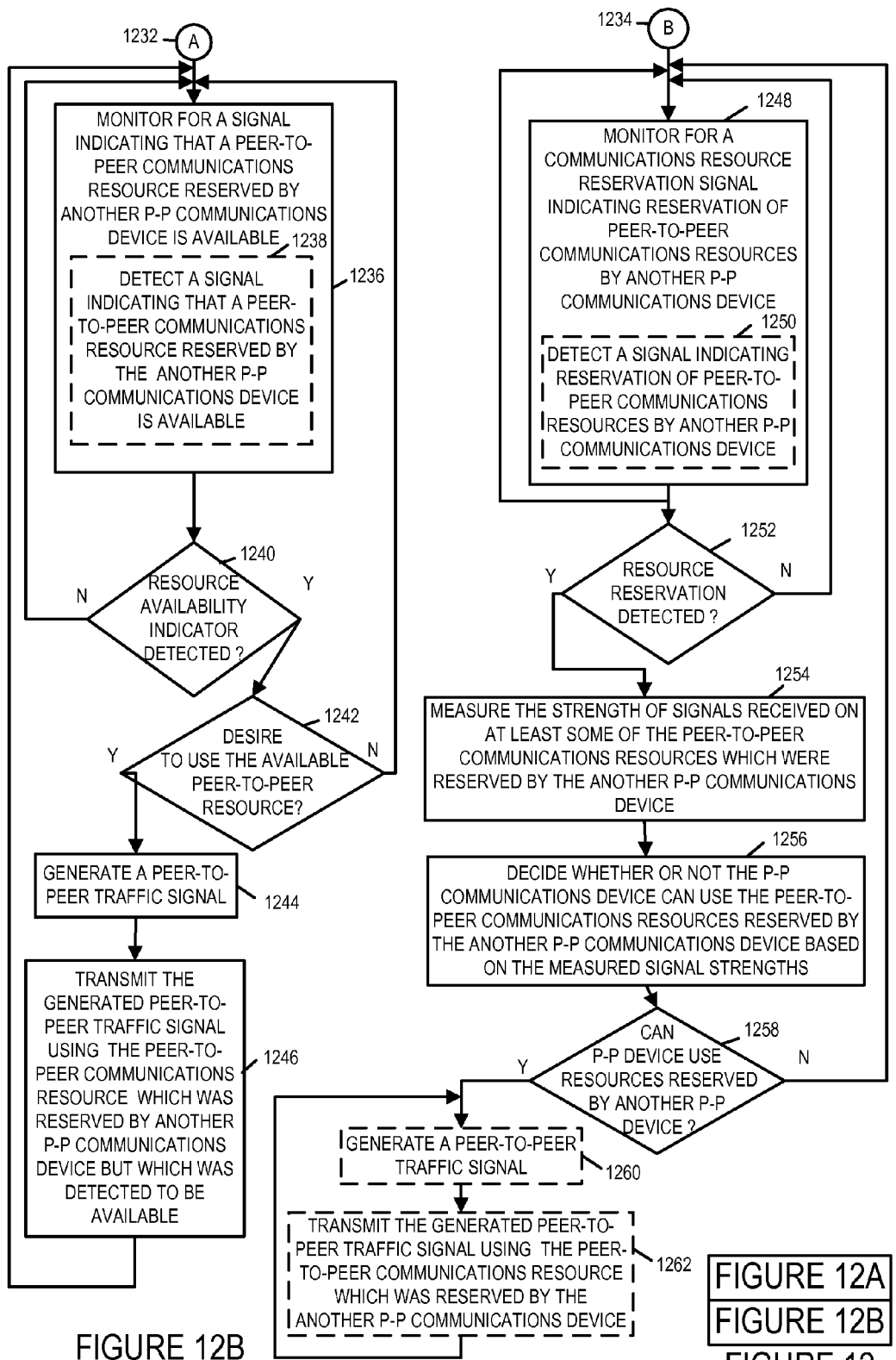
FIG. 12B is a second part is a flowchart of an exemplary method of operating a peer-to-peer communications device in accordance with various exemplary embodiments.

FIG. 12, comprising the combination of FIG. 12A and FIG. 12B, is a flowchart of an exemplary method of operating a peer-to-peer communications device, e.g., a mobile wireless terminal supporting peer-to-peer communications, in accordance with an exemplary embodiment. Operation starts in step 1202, where the peer-to-peer communications device is powered on and initialized. Operation proceeds from start step 1202 to step 1204, step 1236, via connecting node A 1232, and step 1248 via connecting node B 1234.

Returning to step 1204, the peer-to-peer communications device decides whether or not it desires semi-persistent or persistent peer-to-peer communications resources. In some embodiments, in step 1204 the peer-to-peer communications device decides whether or not to self reserve peer-to-peer communications resources as a function of the type of application the device intends to use and/or the type of data the device intends to communicate. In some such embodiments, the device decides to self-reserve peer-to-peer communications resources when the data intended to be communicated is latency dependent and/or is intended to be communicated on a regular basis, e.g., in accordance with a schedule. If the peer-to-peer communications device decides that it desires semi-persistent or persistent peer-to-peer communications resources, then operation proceeds from step 1204 to step 1206; otherwise operation proceeds from the output of step 1204 to the input of step 1204.

Returning to step 1206, in step 1206 the peer-to-peer communications device monitors peer-to-peer communications resources and determines peer-to-peer communications resources that are available to be reserved. Operation proceeds from step 1206 to step 1208, in which the peer-to-peer communications device generates a peer-to-peer resource reservation signal reserving peer-to-peer communications resources for a period of time. The selected resources to be reserved are based on the monitoring of step 1206, e.g., selected from among determined available peer-to-peer communications resources. Operation proceeds from step 1208 to step 1210. In step 1210 the peer-to-peer communications device transmits the generated peer-to-peer resource reservation signal reserving peer-to-peer communications resources for a period of time. In some embodiments in step 1210, the transmitted generated peer-to-peer resource reservation signal reserves peer-to-peer communications resources for a period of time which is at least N times a period between resource reservation signaling intervals, where N is a positive integer greater than 2. Operation proceeds from step 1210 to step 1212 and step 1216, and in some embodiments, to step 1214.

Returning to step 1212, in step 1212 the peer-to-peer communications device is controlled to refrain from transmitting a resource reservation signal reserving said peer-to-peer communications resources for said period of time. In step 1214, which is performed in some, but not necessarily all embodiments, the peer-to-peer communications device broadcasts one or more reservation indicator signals during said period of time in which peer-to-peer communications resources were reserved by the peer-to-peer communications device. In some embodiments, in step 1214 the peer-to-peer communications device transmits, during the period of time for which resources are reserved, a reservation indicator signal at least once every M seconds, where M is greater than the period between two resource reservation intervals and is a maximum amount of time a device is allowed to go without transmitting a signal indicating resources that it has reserved.

In step 1216, the peer-to-peer communications device determines if it intends to use its reserved peer-to-peer communications resource during an upcoming traffic time period in which the peer-to-peer communications device has reserved resources. If the peer-to-peer communications device decides that it intends to use its reserved peer-to-peer communications resource during the upcoming traffic time period, then operation proceeds from step 1216 to step 1218 or to step 1222, depending upon the particular embodiment. In some embodiments, steps 1218 and 1220 are included and performed. In other embodiments, step 1218 and 1220 are bypassed. Returning to step 1218, in step 1218 the peer-to-peer communications device generates a signal indicating that its reserved peer-to-peer communications resource is unavailable during the upcoming traffic time period. Operation proceeds from step 1218 to step 1220 in which the peer-to-peer communications device broadcasts the generated signal indicating that the reserved resource is unavailable. Then, in step 1222 the peer-to-peer communications device generates peer to peer traffic signals, and in step 1224 the peer-to-peer communications device transmits the generated peer-to-peer traffic signals using the reserved resource. Thus, in step 1224 the peer-to-peer communications device uses at least some of the reserved peer-to-peer communications resources during the period of time for which it has reserved resources. Operation proceeds from step 1224 to step 1230.

Returning to step 1216, in step 1216 if the peer-to-peer communications device decides that it does not intend to use its reserved peer-to-peer communications resources during the upcoming traffic time period in which the peer-to-peer communications device has reserved resources, then operation proceeds from step 1216 to step 1226. If operation proceeds from step 1216 to step 1226, the peer-to-peer communications device has decided in step 1216 not to use one of its reserved resources during the reservation time period. In step 1226, the peer-to-peer communications device generates a signal indicating that the reserved resource is available. Then, in step 1228 the peer-to-peer communications device broadcasts the generated signal indicating that the reserved resource is available. Thus the broadcast signal indicates that the peer-to-peer communications device will not be using its reserved peer-to-peer communications resource during the upcoming traffic time period. In various embodiments, in step 1228 the peer-to-peer communications device broadcasts a resource availability indicator prior to a traffic time period in which the one of the reserved resources will not be used. In some embodiments, the resource availability indicator is a one bit indicator transmitted in a slot of a resource availability channel, said slot having a predetermined known relationship to one of the reserved resources which will not be used. Operation proceeds from step 1228 to step 1230. In step 1230 the peer-to-peer communications device checks if it has additional reserved peer-to-peer communications resources. If the peer-to-peer communications device has additional reserved peer-to-peer communications resources then operation proceeds from step 1230 to step 1216; otherwise, operation proceeds from step 1230 to step 1204.

Returning to step 1236, in step 1236 the peer-to-peer communications device monitors for a signal indicating that a peer-to-peer communications resources reserved by another peer-to-peer communications device is available, e.g., is not going to be used by the device which reserved the resource during the upcoming traffic time period. Step 1236, may, and sometimes does include step 1238 in which the peer-to-peer communications device detects a signal indicating that a peer-to-peer communications resource reserved by another peer-to-peer communications device is available. In some embodiments, in step 1238 the peer-to-peer communications device detects a resource availability indicator transmitted by another device indicating that a communications resource reserved by the another device will not be used. Operation proceeds from step 1236 to step 1240. In step 1240 the peer-to-peer communications device determines if a resource availability indicator was detected in the monitoring of step 1236 indicating that a reserved peer-to-peer communications resource is not going to be used by the device which reserved the resource. If the determination of step 1240 is that a resource availability indicator was not detected, then operation proceeds from step 1240 to step 1236. However, if the determination of step 1240 is that a resource availability indicator was detected, then operation proceeds from step 1240 to step 1242.

In step 1242 the peer-to-peer communications device decides whether or not it desires to use the peer-to-peer communications resource that it has detected to be available. For example, the peer-to-peer communications device checks if it has queued peer-to-peer traffic data that it would like to communicate in the determined available peer-to-peer communications resource if the upcoming traffic time period. If the peer-to-peer communications device decides that it does not desire to use the determined available peer-to-peer communications resource in the upcoming traffic time period, then operation proceeds from step 1242 to step 1236. However, if the peer-to-peer communications device decides that it would like to use the identified peer-to-peer communications resource, then operation proceeds from step 1242 to step 1244. In step 1244 the peer-to-peer communications device generates a peer-to-peer traffic signal, and in step 1246 transmits the generated peer-to-peer traffic signal using the peer-to-peer communications resources which was reserved by another peer-to-peer communications device but which was detected to be available, e.g., detected to be unused by the device which reserved the resource. Thus in step 1246 the peer-to-peer communications device uses the communications resource that the availability indicator, detected in step 1238, indicates will not be used by the device which reserved the resource. Operation proceeds from step 1246 to step 1236.

Returning to step 1248, in step 1248, the peer-to-peer communications device monitors for a communications resource reservation signal indicating reservation of peer-to-peer communications resources by another peer-to-peer communications device. Step 1248 may, and sometimes does, include step 1250 in which the peer-to-peer communications device detects a signal indicating reservation of peer-to-peer communications resources by another peer-to-peer communications device. In some embodiments, in step 1250 the peer-to-peer communications device receives a peer-to-peer resource reservation signal reserving a set of resources for another device for a plurality of recurring time intervals. Step 1248 is performed on an ongoing basis, e.g., for each time interval in which peer-to-peer communications devices may self-reserve semi-persistent or persistent peer-to-peer communications resources. Operation proceeds from step 1248 to step 1252.

In step 1252 the peer-to-peer communications device determines if a peer-to-peer resource reservation was detected during the monitoring of step 1248. If a resource reservation was not detected, then operation proceeds from step 1252 to the input of step 1248. However, if a resource reservation was detected, then operation proceeds from step 1252 to step 1254. In step 1254 the peer-to-peer communications device measures the strength of signals received on at least some of the peer-to-peer communications resources which were reserved by the another peer-to-peer communications device. In some embodiments, in step 1254 the peer-to-peer communications device measures the strength of signals received on said set of resources during at least one of the plurality of recurring time intervals. Operation proceeds from step 1254 to step 1256. In step 1256, the peer-to-peer communications device decides whether or not the peer-to-peer communications device can use the peer-to-peer communications resources reserved by the another peer-to-peer communications device based on the measured signals strengths of step 1254. In some embodiments, in step 1256 the peer-to-peer communications device makes a decision whether or not to transmit peer-to-peer signals on the set of resources during a future one of said plurality of recurring time intervals based on the measured strength of the signals received on said set of resources. In some embodiments, in step 1256 the peer-to-peer communications device estimates the amount of interference that it expects it will cause to communications of said another peer-to-peer communications device if the peer-to-peer communications device transmits concurrently with the transmission of the another peer-to-peer communications device on the peer-to-peer communications resources which have been reserved by the another peer-to-peer communications device. In some such embodiments, in step 1256 the peer-to-peer communications device decides that it is allowed to use the peer-to-peer communications resources reserved by said another peer-to-peer communications device if the estimated interference is below a predetermined threshold level.

In step 1258 if the peer-to-peer communications device decides that it is allowed to use the peer-to-peer communications reserved to the another peer-to-peer communications device, then operation proceeds from step 1258 to step 1260. Step 1260 and step 1262 may be performed while the another peer-to-peer communications device has reserved peer-to-peer communications resources and while the peer-to-peer communications device has traffic data that it would like to transmit on those reserved resources.

Figure 13:
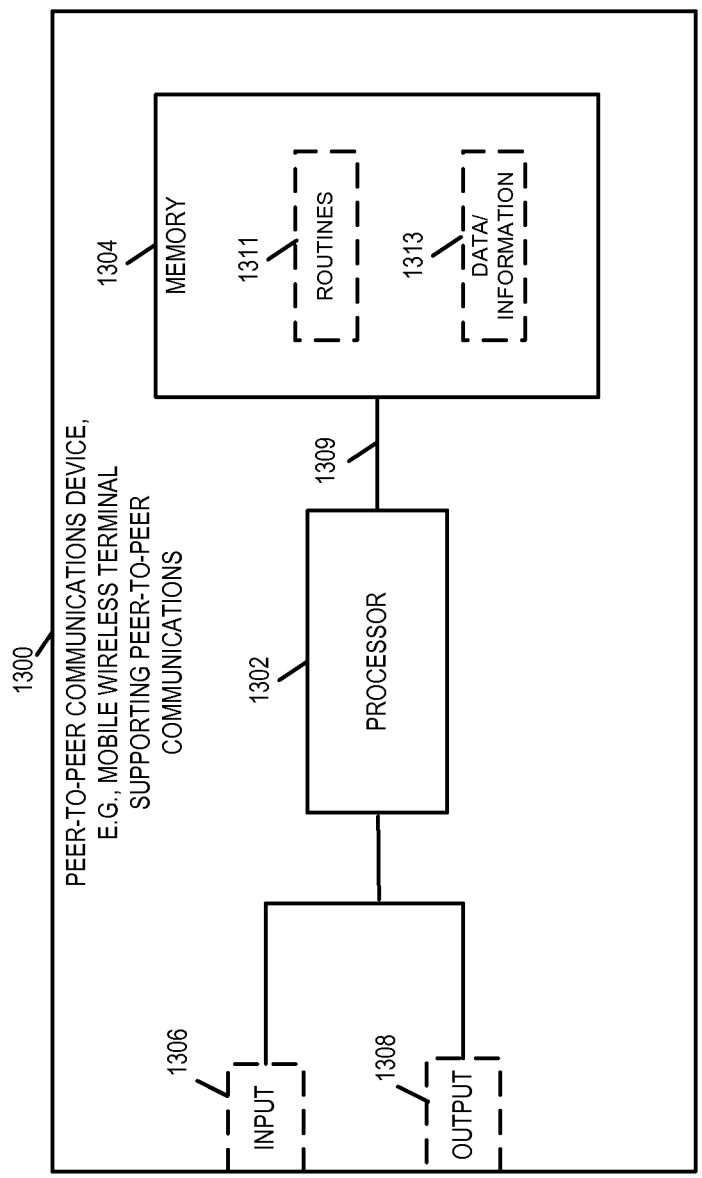
FIG. 13 is a drawing of an exemplary peer-to-peer communications device, e.g., a mobile wireless terminal supporting peer to peer communications, in accordance with an exemplary embodiment.

FIG. 13 is a drawing of an exemplary peer-to-peer communications device 1300, e.g., a mobile wireless terminal supporting direct peer to peer communications sometimes referred to as device to device communications, in accordance with an exemplary embodiment. Exemplary peer-to-peer communications device 1300 is, e.g., one of the peer-to-peer wireless terminals of system 500 of FIG. 5. Exemplary peer-to-peer communications device 1300 may, and sometimes does, implement a method in accordance with flowchart 1200 of FIG. 12.

Communications device 1300 includes a processor 1302 and memory 1304 coupled together via a bus 1309 over which the various elements (1302, 1304) may interchange data and information. Communications device 1300 further includes an input module 1306 and an output module 1308 which may be coupled to processor 1302 as shown. However, in some embodiments, the input module 1306 and output module 1308 are located internal to the processor 1302. Input module 1306 can receive input signals. Input module 1306 can, and in some embodiments does, include a wireless receiver and/or a wired or optical input interface for receiving input. Output module 1308 may include, and in some embodiments does include, a wireless transmitter and/or a wired or optical output interface for transmitting output. In some embodiments, memory 1304 includes routines 1311 and data/information 1313.

Figure 14A:
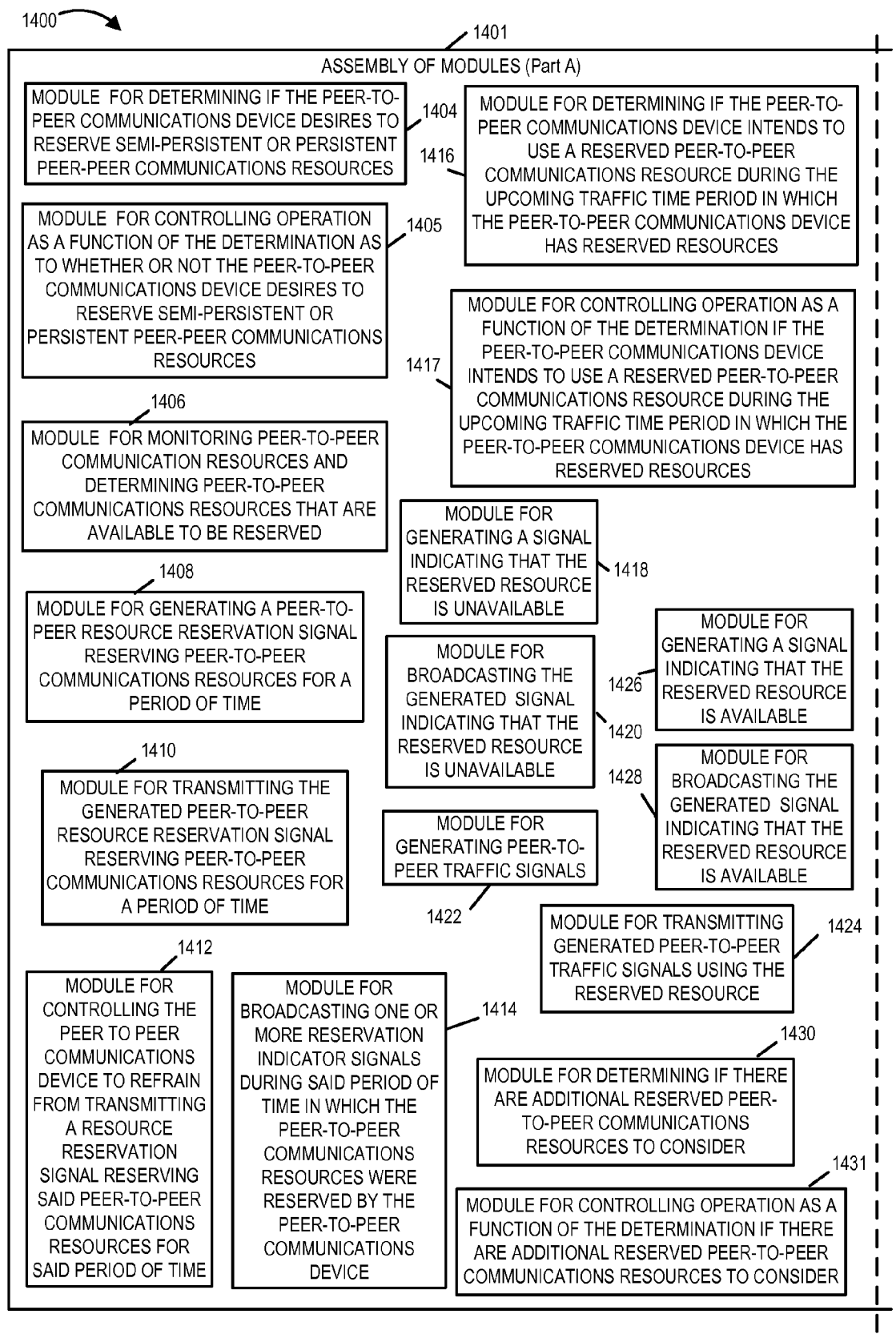
FIG. 14A is a first portion of an assembly of modules which can, and in some embodiments is, used in the exemplary peer-to-peer communications device illustrated in FIG. 13.
Figure 14:
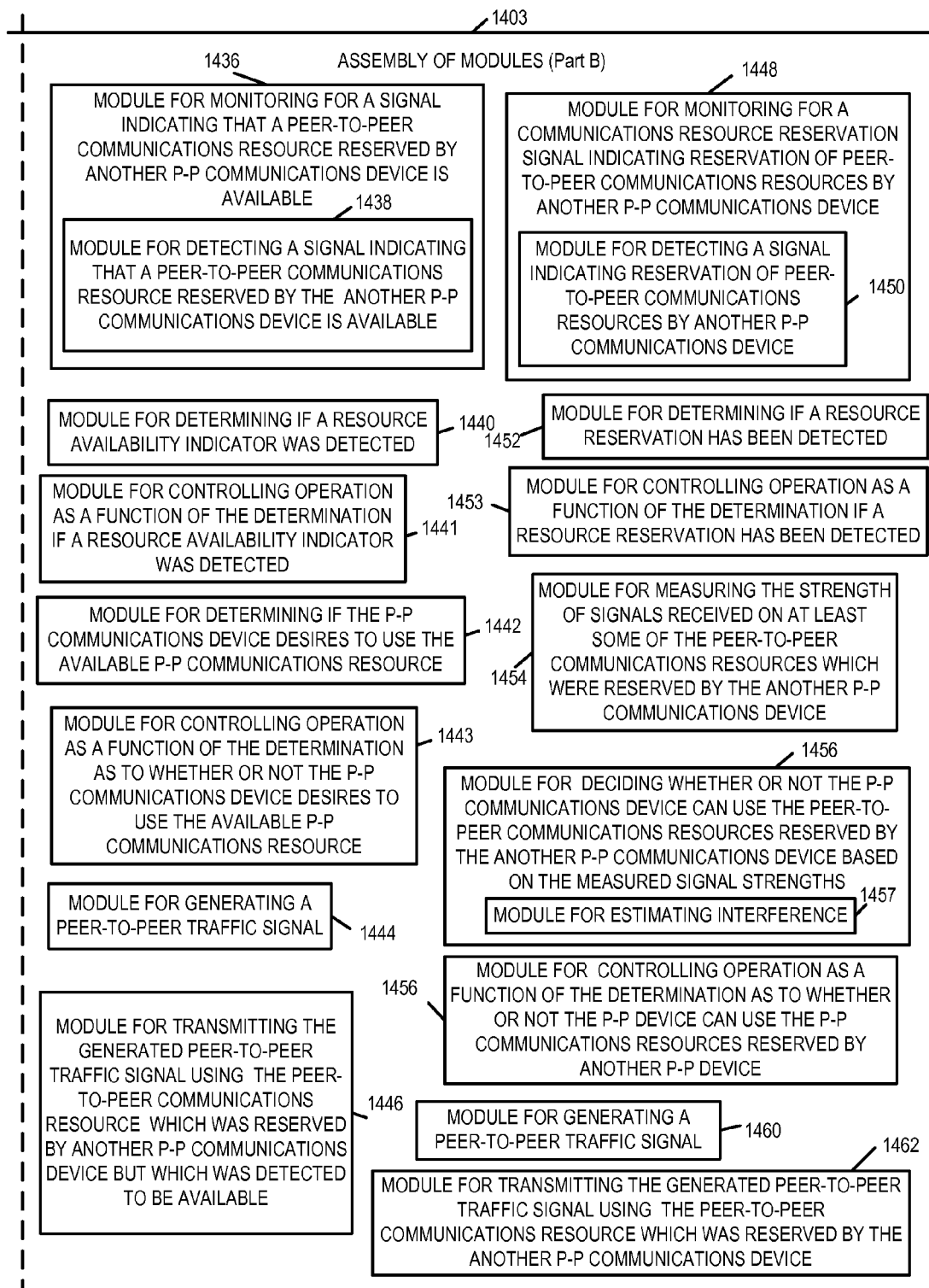
FIG. 14B is a second portion of an assembly of modules which can, and in some embodiments is, used in the exemplary peer-to-peer communications device illustrated in FIG. 13.

FIG. 14, comprising the combination of FIG. 14A and FIG. 14B, is an assembly of modules 1400, comprising Part A 1401 and Part B 1403, which can, and in some embodiments is, used in the peer-to-peer communications device 1300 illustrated in FIG. 13. The modules in the assembly 1400 can be implemented in hardware within the processor 1302 of FIG. 13, e.g., as individual circuits. Alternatively, the modules may be implemented in software and stored in the memory 1304 of communications device 1300 shown in FIG. 13. In some such embodiments, the assembly of modules 1400 is included in routines 1311 of memory 1304 of device 1300 of FIG. 13. While shown in the FIG. 13 embodiment as a single processor, e.g., computer, it should be appreciated that the processor 1302 may be implemented as one or more processors, e.g., computers. When implemented in software the modules include code, which when executed by the processor, configure the processor, e.g., computer, 1302 to implement the function corresponding to the module. In some embodiments, processor 1302 is configured to implement each of the modules of the assembly of modules 1400. In embodiments where the assembly of modules 1400 is stored in the memory 1304, the memory 1304 is a computer program product comprising a computer readable medium, e.g., a non-transitory computer readable medium, comprising code, e.g., individual code for each module, for causing at least one computer, e.g., processor 1302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 8 control and/or configure the peer-to-peer communications device 1300 or elements therein such as the processor 1302, to perform the functions of the corresponding steps illustrated and/or described in the method of flowchart 1200 of FIG. 12.

Assembly of modules 1400 includes a module for determining if the peer-to-peer communications device desires to reserve semi-persistent or persistent peer-to-peer communications resources 1404, a module for controlling operation as a function of the determination as to whether or not the peer-to-peer communications device desires to reserve semi-persistent or persist peer-to-peer communications resources 1405, a module for monitoring peer-to-peer communications resources and determining peer-to-peer communications resources that are available to be reserved 1406, a module for generating a peer-to-peer resource reservation signal reserving peer-to-peer communications resources for a period of time 1408, a module for the transmitting the generated peer-to-peer resource reservation signal reserving peer-to-peer communications resources for a period of time 1410, a module for controlling the peer-to-peer communications device to refrain from transmitting a resource reservation signal reserving said peer-to-peer communications resources for said period of time 1412, and a module for broadcasting one or more reservation indicator signal during said period of time in which the peer-to-peer communications resources were reserved by the peer-to-peer communications device 1414. Assembly of modules 1400 further includes a module for determining if the peer-to-peer communications device intends to use its reserved peer-to-peer communications resource during the upcoming traffic time period in which the peer-to-peer communications device has a reserved peer-to-peer communications resource 1416, a module for controlling operation as a function of the determination if the peer-to-peer communications device intends to use its reserved peer-to-peer communications resource during the upcoming traffic time period in which the peer-to-peer communications device has a reserved peer-to-per communications resource 1417, a module for generating a signal indicating that the reserved peer-to-peer communications resource is unavailable 1418, a module for broadcasting the generated signal indicating that the reserved peer-to-peer communications resource is unavailable 1420, a module for generating peer-to-peer traffic signals 1422, and a module for transmitting the generated peer-to-peer traffic signals using the reserved peer-to-peer communications resource. Assembly of modules 1400 further includes a module for generating a signal indicating that the reserved peer-to-peer communication resource is available in response to the determination that the peer-to-peer communications device does not intent to use its peer-to peer communications resource in the upcoming traffic time interval 1426, and a module for broadcasting the generated signal indicating that the reserved peer-to-peer communications resource is available in response to the determination that the peer-to-peer communications device does not intend to use its reserved peer-to-peer communications resource in the upcoming traffic time period 1428. Assembly of modules 1400 further includes a module for determining if there are additional reserved peer-to-peer communications resources to consider 1430, and a module for controlling operation as a function of the determination if there are additional reserved peer-to-peer communications resources to consider 1431.

Assembly of modules 1400 further includes a module for monitoring for a signal indicating that a peer-to-peer communications resource reserved by another peer-to-peer communications device for an upcoming traffic time period 1436. Module 1436 includes a module for detecting a signal indicating that a peer-to-peer communications resource by the another peer-to-peer communications device is available 1438. Assembly of modules 1400 further includes a module for determining if a resource availability indicator was detected 1440, a module for controlling operation as a function of the determination if a resource availability indicator was detected 1441, a module for controlling operation as a function of the determination as to whether or not the peer-to-peer communications device desires to use the available peer-to-peer communications resource 1443, a module for generating a peer-to-peer traffic signal 1444 and a module for transmitting the generated peer-to-peer traffic signal using the peer-to-peer communications resources which as reserved by another peer-to-peer communications device but which was detected to be available 1446.

Assembly of modules 1400 further includes a module for monitoring for a communications resource reservation signal indicating reservation of peer-to-peer communications resources by another peer-to-peer communications device 1448. Module 1448 includes a module for detecting a signal indicating reservation of peer-to-peer communications resources by another peer-to-peer communications device 1450. Assembly of modules 1400 further includes a module for determining if a resource reservation signal indicating reservation of peer-to-peer communications resources has been detected 1452, a module for controlling operation as a function of the determination if a resources reservation has been detected 1453, and a module for measuring the strength of signals received on at least some of the peer-to-peer communications resources which were reserved by the another peer-to-peer communications device 1454. Assembly of modules 1400 further includes a module for deciding whether or not the peer-to-peer communications device can use the peer-to-peer communications resources reserved by the another peer-to-peer communications device based on the measured signal strengths 1456, a module for controlling operation as a function of the determination as to whether or not the peer-to-peer communications device can use the peer-to-peer communications resources reserved by the another peer-to-peer communications device 1456, a module for generating a peer-to-peer traffic signal 1460 and a module for transmitting the generated peer-to-peer traffic signal using the peer-to-peer communications resource which was reserved by the another peer-peer communications device 1462. Module 1456 includes a module 1457 for estimating interference that the peer-to-peer communications device is expected to cause to the peer-to-peer traffic communications of the another peer-to-peer communications device which has reserved peer-to-peer communications resources if the peer-to-peer communications device should concurrently transmit peer-to-peer traffic signals on those same peer-to-peer communications resources.

In some embodiments, module 1410 transmits a peer-to-peer resource reservation signal reserving peer-to-peer communication resource for a period of time which is at least N times a time period between resource reservation signaling intervals, where N is a positive integer greater than 2. Module 1412, in some embodiments, controls the peer-to-peer communications device to refrain from transmitting a resource reservation signal reserving said peer-to-peer resources during said time period. Module 1424 uses at least some of the reserved peer-to-peer resources during said time period.

Module 1414, in some embodiments, transmits, during said period of time during which resources are reserved, a reservation indicator signal at least once every M seconds, where M is greater than the period between two resource reservation intervals and is a maximum amount of time a device is allowed to go without transmitting a signal indicating that it has reserved peer-to-peer communications resources.

Module 1416 may, and sometimes does, determine not to use one of its reserved resources during the time period in which it has reserved resources, e.g., in response to a determination that it has no data to communicate or in response, or in response that it has no new data to communicate. For example, the device may be communicating its current position and its position may not have changed from the last time that it reported its position. In some embodiments, module 1428 broadcasts a resource availability indicator, prior to a traffic time period in which said one of the reserved resources will not be used. In some such embodiments, the resource availability indicator is a one bit indicator transmitted in a slot of a resource availability channel, said slot having a predetermined known relationship to the one of the reserved resources which will not be used.

In some embodiments, module 1438 detects a resource availability indicator transmitted by another device indicating that a communications resource reserved by the another device will not be used. Module 1446 uses the communications resource that the resource availability indicator, detected by module 1438, indicates will not be used by the device which reserved the resource.

Module 1450, in some embodiments, receives a peer-to-peer resource reservation signal reserving a set of resources for another device for a plurality of recurring time intervals. In some such embodiments, module 1454 measures the strength of signals received on the set of resources during at least one of the plurality of recurring time intervals. In some such embodiments, module 1456 makes a decision whether or not to transmit peer to peer signal on said set of resources during a future one of said plurality of recurring time intervals based on the measured strength of signals received on said set of resources.

Figure 15:
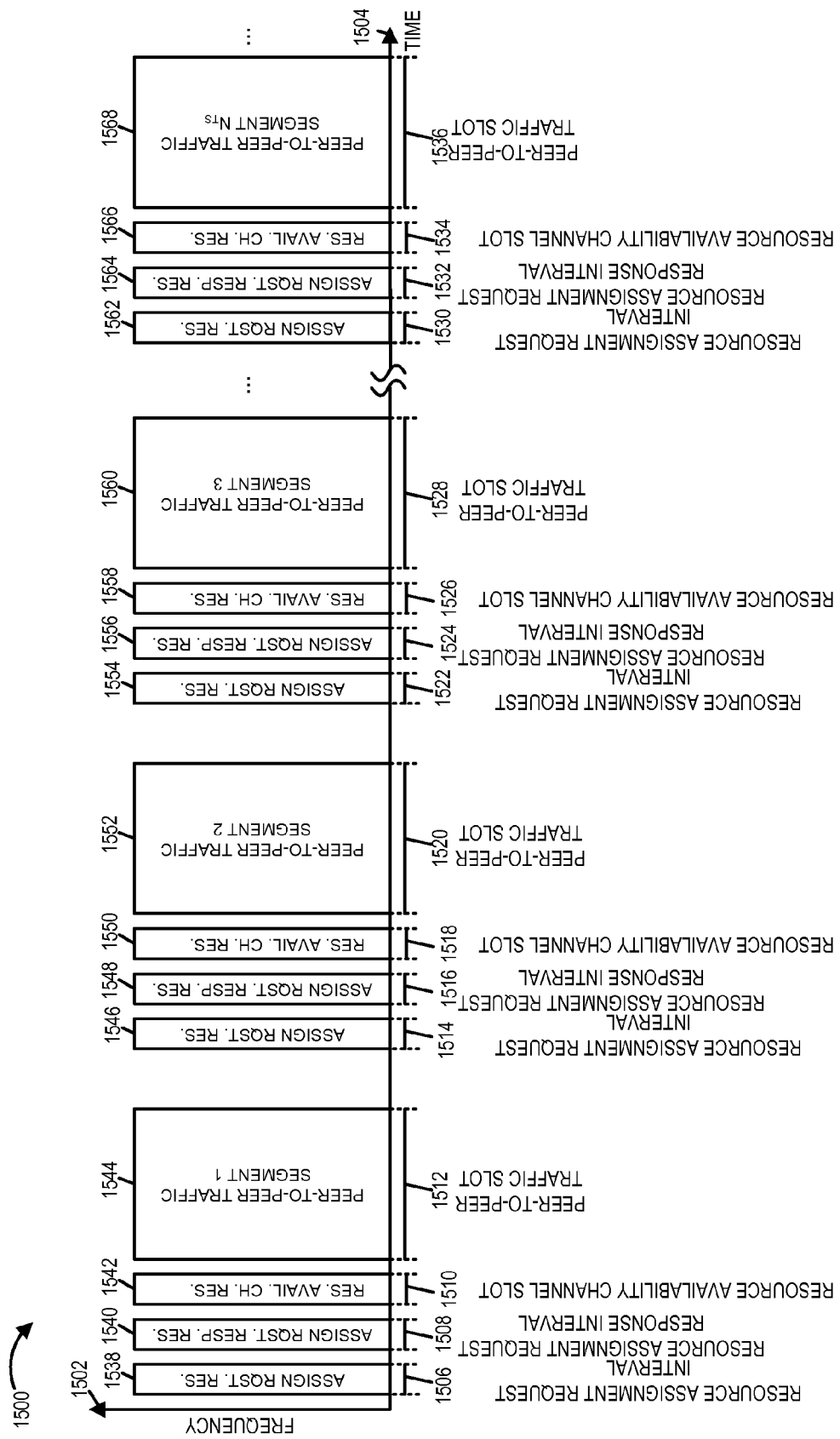
FIG. 15 is a drawing of an exemplary timing-frequency structure in accordance with an exemplary embodiment.

FIG. 15 is a drawing 1500 of an exemplary timing-frequency structure in accordance with an exemplary embodiment. The exemplary timing-frequency structure is, e.g., used by system 100 of FIG. 1. Vertical axis 1502 represents frequency, e.g., tones, and the horizontal axis 1504 represent time, e.g., OFDM symbol transmission time intervals. The exemplary timing structure includes resource assignment request intervals, resource assignment request response intervals, resource availability channel slots and peer-to-peer traffic slots. The air link resources include: assignment request resources for carrying requests of assignment of peer-to-peer communications resources from a wireless terminal to a base station, assignment request response resources for carrying peer-to-peer communications resource assignments from a base station to a wireless terminal, resource availability channel resources for carrying resource availability indicators transmitted by wireless terminals with assigned resources and intended to be received by other wireless terminals, and peer-to-peer traffic segments for carrying peer-to-peer traffic signals between wireless terminals.

In this example, assignment request resource 1538 corresponds to resource assignment request interval 1506; assignment request response resource 1540 corresponds to resource assignment request response interval 1508; resource availability channel resource 1542 corresponds to resource availability channel slot 1510; and peer-to-peer traffic segment 1 1544 corresponds to peer-to-peer traffic slot 1512. Assignment request resource 1546 corresponds to resource assignment request interval 1514; assignment request response resource 1548 corresponds to resource assignment request response interval 1516; resource availability channel resource 1550 corresponds to resource availability channel slot 1518; and peer-to-peer traffic segment 2 1552 corresponds to peer-to-peer traffic slot 1520. Assignment request resource 1554 corresponds to resource assignment request interval 1522; assignment request response resource 1556 corresponds to resource assignment request response interval 1524; resource availability channel resource 1558 corresponds to resource availability channel slot 1526; and peer-to-peer traffic segment 3 1560 corresponds to peer-to-peer traffic slot 1528. Assignment request resource 1562 corresponds to resource assignment request interval 1530; assignment request response resource 1564 corresponds to resource assignment request response interval 1532; resource availability channel resource 1566 corresponds to resource availability channel slot 1534; and peer-to-peer traffic segment $N_{TS}$ 1568 corresponds to peer-to-peer traffic slot 1536.

In this example, there is a known predetermined relationship between resource availability channel resources and peer-to-peer traffic segments. A channel availability indicated communicated on channel availability resource 1542 refers to peer-to-peer traffic segment 1 1544. A channel availability indicated communicated on channel availability resource 1550 refers to peer-to-peer traffic segment 2 1552. A channel availability indicated communicated on channel availability resource 1558 refers to peer-to-peer traffic segment 3 1560. A channel availability indicated communicated on channel availability resource 1566 refers to peer-to-peer traffic segment $N_{TS}$ 1568.

An assignment request signal communicated on an assignment request resource refers to a plurality of peer-to-peer segments. An assignment request response signal communicated on an assignment request resource refers to a plurality of peer-to-peer segments, e.g., less than or equal to the request. The assignment is a persistent or semi-persistent assignment of peer-to-peer communications resources.

Figure 16:
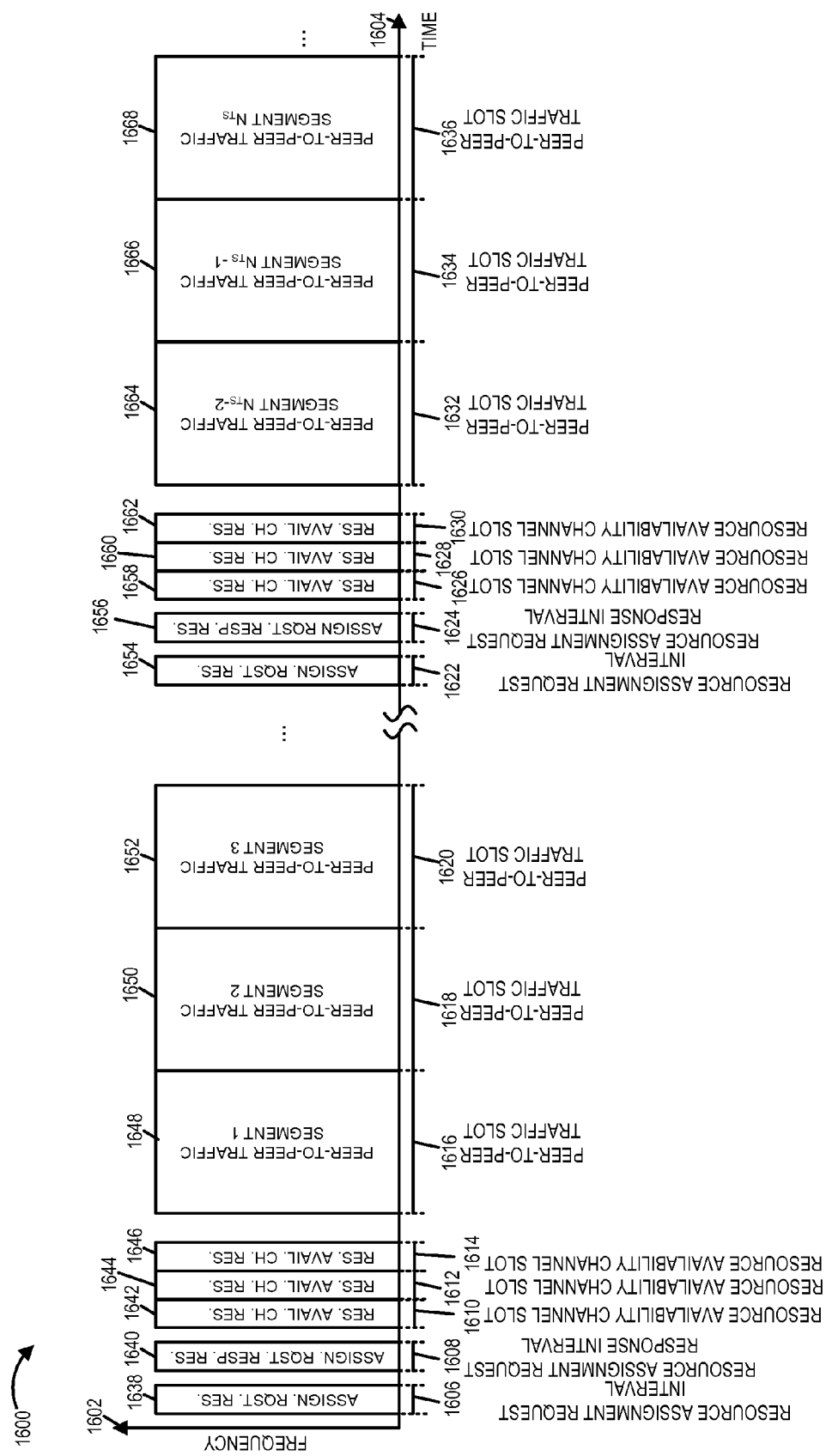
FIG. 16 is a drawing of an exemplary timing-frequency structure in accordance with an exemplary embodiment.

FIG. 16 is a drawing 1600 of an exemplary timing-frequency structure in accordance with an exemplary embodiment. The exemplary timing-frequency structure is, e.g., used by system 100 of FIG. 1. Vertical axis 1602 represents frequency, e.g., tones, and the horizontal axis 1604 represent time, e.g., OFDM symbol transmission time intervals. The exemplary timing structure includes resource assignment request intervals, resource assignment request response intervals, resource availability channel slots and peer-to-peer traffic slots. The air link resources include: assignment request resources for carrying requests of assignment of peer-to-peer communications resources from a wireless terminal to a base station, assignment request response resources for carrying peer-to-peer communications resource assignments from a base station to a wireless terminal, resource availability channel resources for carrying resource availability indicators transmitted by wireless terminals with assigned resources and intended to be received by other wireless terminals, and peer-to-peer traffic segments for carrying peer-to-peer traffic signals between wireless terminals.

In this example, assignment request resource 1638 corresponds to resource assignment request interval 1606; assignment request response resource 1640 corresponds to resource assignment request response interval 1608; resource availability channel resource 1642 corresponds to resource availability channel slot 1610; resource availability channel resource 1644 corresponds to resource availability channel slot 1612; resource availability channel resource 1646 corresponds to resource availability channel slot 1614; peer-to-peer traffic segment 1 1648 corresponds to peer-to-peer traffic slot 1616; peer-to-peer traffic segment 2 1650 corresponds to peer-to-peer traffic slot 1618; and peer-to-peer traffic segment 3 1652 corresponds to peer-to-peer traffic slot 1620. Assignment request resource 1654 corresponds to resource assignment request interval 1622; assignment request response resource 1656 corresponds to resource assignment request response interval 1624; resource availability channel resource 1658 corresponds to resource availability channel slot 1626; resource availability channel resource 1660 corresponds to resource availability channel slot 1628; resource availability channel resource 1662 corresponds to resource availability channel slot 1630; peer-to-peer traffic segment $N_{TS}$-2 1664 corresponds to peer-to-peer traffic slot 1632; peer-to-peer traffic segment $N_{TS}$-1 1666 corresponds to peer-to-peer traffic slot 1634; and peer-to-peer traffic segment $N_{TS}$ 1668 corresponds to peer-to-peer traffic slot 1636.

In this example, there is a known predetermined relationship between resource availability channel resources and peer-to-peer traffic segments. A channel availability indicator communicated on channel availability resource 1642 refers to peer-to-peer traffic segment 1 1648. A channel availability indicator communicated on channel availability resource 1644 refers to peer-to-peer traffic segment 2 1650. A channel availability indicator communicated on channel availability resource 1646 refers to peer-to-peer traffic segment 3 1652. A channel availability indicator communicated on channel availability resource 1658 refers to peer-to-peer traffic segment $N_{TS}$-2 1664. A channel availability indicator communicated on channel availability resource 1660 refers to peer-to-peer traffic segment $N_{TS}$-1 1666. A channel availability indicator communicated on channel availability resource 1662 refers to peer-to-peer traffic segment $N_{TS}$ 1668.

An assignment request signal communicated on an assignment request resource refers to a plurality of peer-to-peer segments. An assignment request response signal communicated on an assignment request resource refers to a plurality of peer-to-peer segments, e.g., less than or equal to the request. The assignment is a persistent or semi-persistent assignment of peer-to-peer communications resources.

Figure 17:
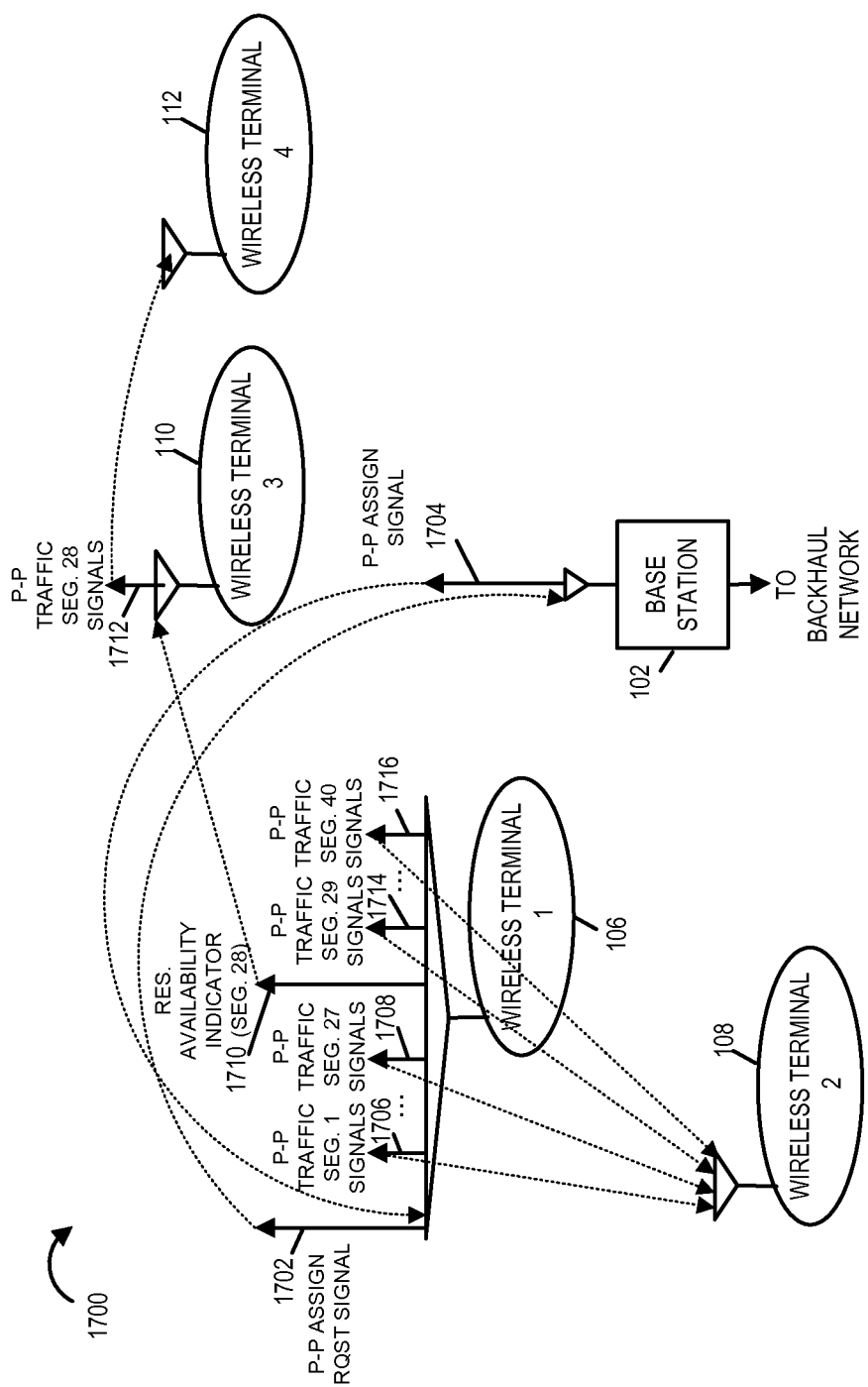
FIG. 17 is a drawing illustrating an example in which an exemplary wireless terminal requests and is assigned peer-to-peer communications resources from a base station for an extended period of time, decides that it is not intending to use one of its assigned peer to peer communications resources, and broadcasts a resource availability indicator.
Figure 18:
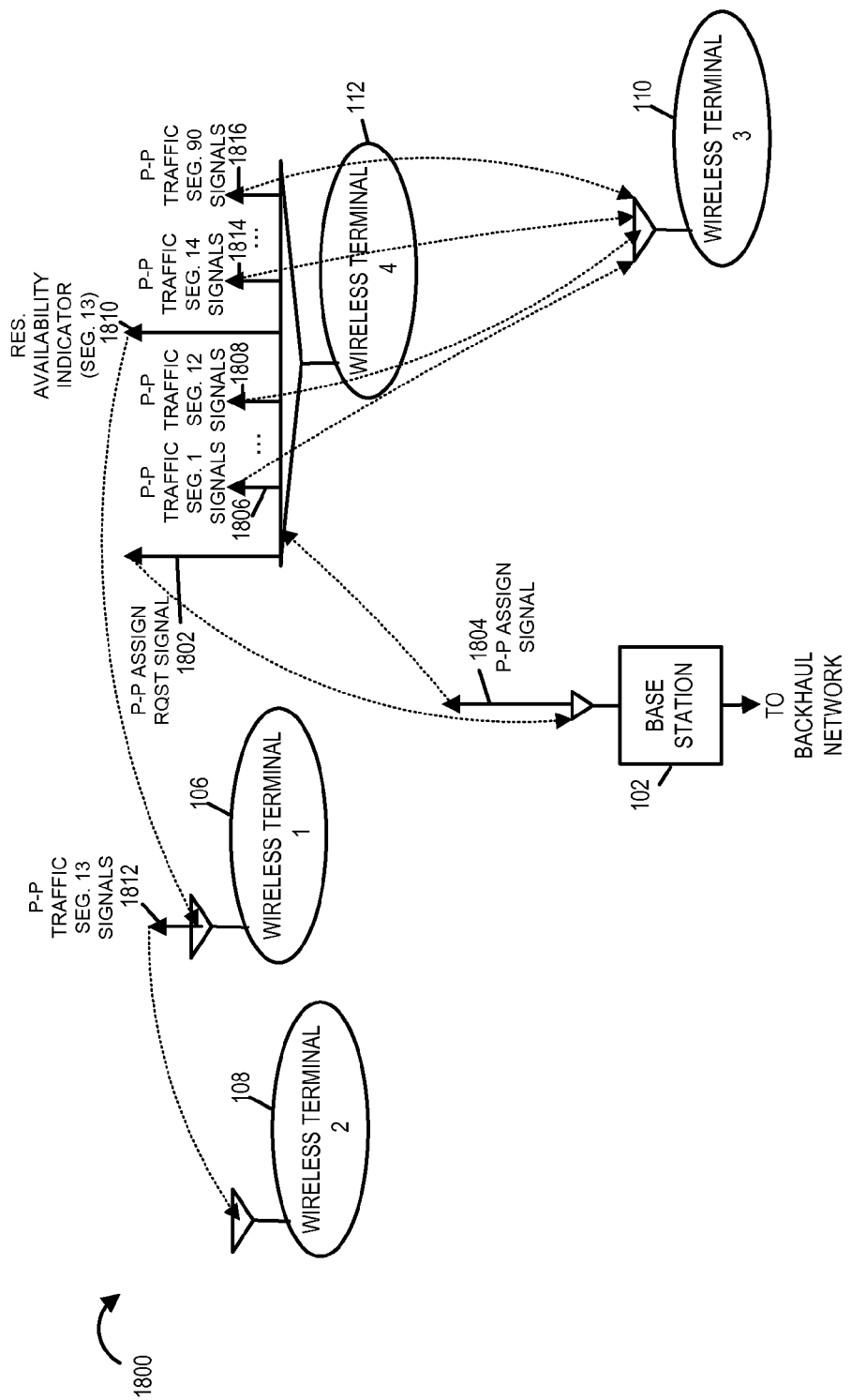
FIG. 18 is a drawing illustrating an example, in which the wireless terminal of FIG. 17 detects a resource availability indicator and uses a peer-to-peer communications resource that was assigned to another wireless terminal which decided not to use its assigned resource.
Figure 19:
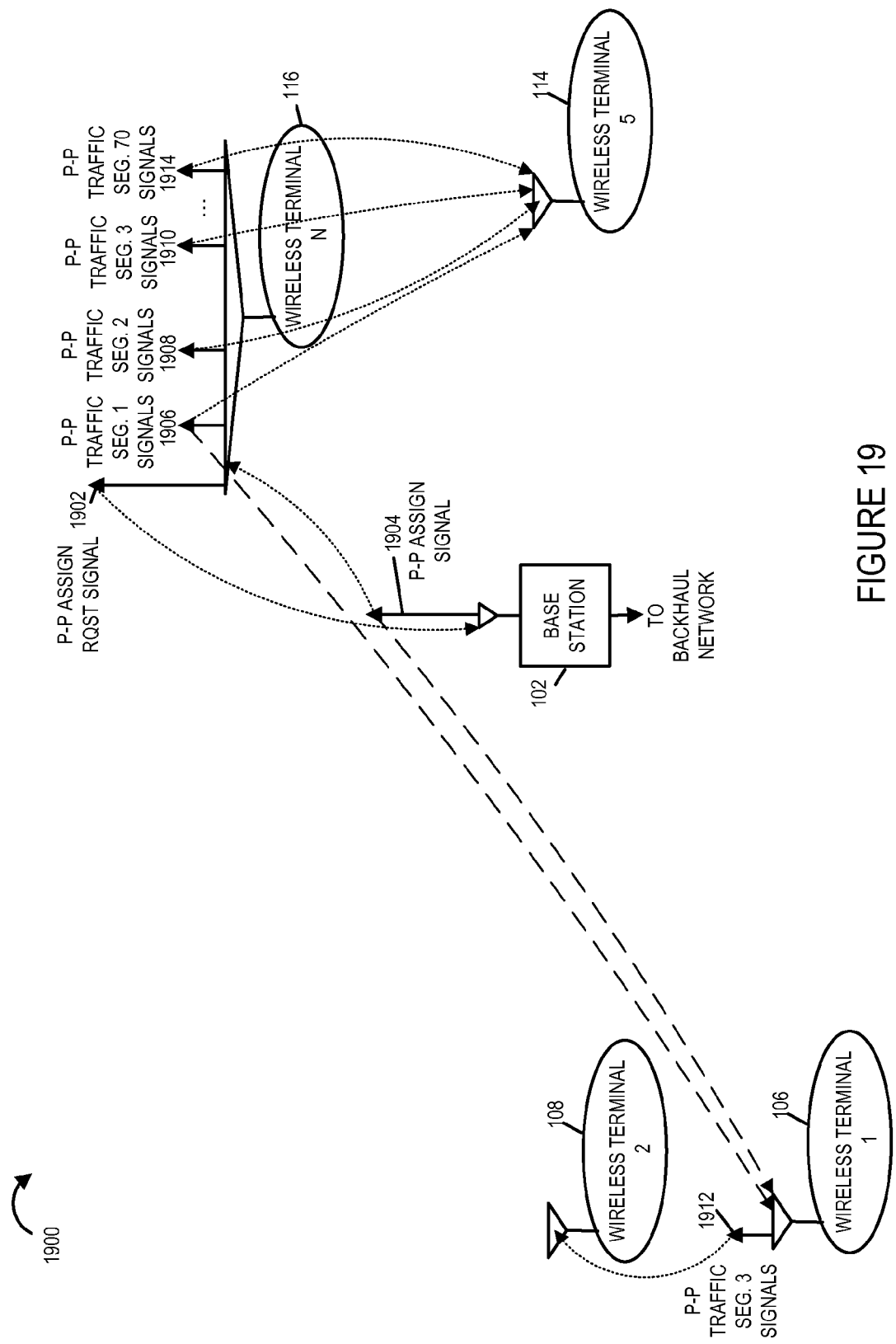
FIG. 19 is a drawing illustrating an example, in which the wireless terminal of FIG. 17 detects a peer-to-peer communications resource assignment directed to another wireless terminal, measures signals communicated by the another wireless terminal on the assigned resource and decides whether or not it can also use the assigned peer-to-peer communications resource as a function of the measured signals.

FIG. 17-19 illustrate an example of operating a wireless terminal in accordance with an exemplary embodiment. Drawing 1700 of FIG. 17 includes exemplary base station 102 and exemplary wireless terminals (wireless terminal 1 106, wireless terminal 2 108, wireless terminal 3 110, wireless terminal 4 112) of system 100 of FIG. 1. WT 1 106 generates and transmits peer-to-peer assignment request signal 1702 requesting assignment of peer-to-peer communications resources for a period of time. Consider that WT 1 106 is requesting assignment of peer-to-peer communications resources for a period of time including 50 peer-to-peer traffic slots in the timing structure. Base station 102 receives assignment request signal 1702 and decides to assign WT 1 106 peer-to-peer communications resources for a period of time including 40 peer-to-peer traffic slots. Base station 102 generates and transmits the peer-to-peer resource assignment signal 1704 communicating the assignment of peer-to-peer communications resources including 40 successive peer-to-peer traffic segments. WT 1 106 receives and processes the assignment signal 1704. WT 1 106 may now use its assigned peer-to-peer communications resources. Before each of its assigned peer-to-peer traffic segment occurs WT 1 106 makes a decision as to whether or not it is going to use its assigned peer-to-peer traffic segment. In this example, WT 1 106 has decided that it is going to use peer to peer traffic segment 1 and therefore generates peer to peer traffic signals 1706 and transmits signals 1706 over its assigned peer-to-peer traffic segment 1 to wireless terminal 2. Similarly, WT 1 decides to use and uses each of its assigned segment through segment 27 in which it transmits peer-to-peer traffic signals 1708 using peer-to-peer traffic segment 27.

However, WT 1 106 determines that it is not going to use its assigned peer-to-peer traffic segment 28. WT 1 106 generates and broadcasts resource availability indicator in signal 1710, using the resource availability channel resource which corresponds to peer-to-peer traffic segment 28. Signals 1710 is detected by wireless terminal 3 110. Wireless terminal 3 110 recognizes that that traffic segment 28 will not be used by the device to which it was assigned. WT 3 110 generates and transmits peer-to-peer traffic signals 1712, using the air link resources of traffic segment 28, to wireless terminal 4 112.

WT 1 106 decides that it is going to use peer to peer traffic segment 29 and therefore generates peer to peer traffic signals 1714 and transmits signals 1714 over its assigned peer-to-peer traffic segment 29 to wireless terminal 2. Similarly, WT 1 decides to use and uses each of its remaining assigned segments through and including segment 40 in which it transmits peer-to-peer traffic signals 1716 using peer-to-peer traffic segment 40.

Drawing 1800 of FIG. 18 includes exemplary base station 102 and exemplary wireless terminals (wireless terminal 1 106, wireless terminal 2 108, wireless terminal 3 110, wireless terminal 4 112) of system 100 of FIG. 1. WT 4 112 generates and transmits peer-to-peer assignment request signal 1802 requesting assignment of peer-to-peer communications resources for a period of time. Consider that WT 4 112 is requesting assignment of peer-to-peer communications resources for a period of time including 90 peer-to-peer traffic slots in the timing structure. Base station 102 receives assignment request signal 1802 and decides to assign WT 4 112 peer-to-peer communications resources for a period of time including 90 peer-to-peer traffic slots. Base station 102 generates and transmits the peer-to-peer resource assignment signal 1804 communicating the assignment of peer-to-peer communications resources including 90 successive peer-to-peer traffic segments. WT 4 112 receives and processes the assignment signal 1804. WT 4 112 may now use its assigned peer-to-peer communications resources. Before each of its assigned peer-to-peer traffic segment occurs WT 4 112 makes a decision as to whether or it is going to use its assigned peer-to-peer traffic segment. In this example, WT 4 112 has decided that it is going to use peer-to-peer traffic segment 1 and therefore generates peer to peer traffic signals 1806 and transmits signals 1806 over its assigned peer-to-peer traffic segment 1 to wireless terminal 3 110. Similarly, WT 4 decides to use and uses each of its assigned segment through segment 12 in which it transmits peer-to-peer traffic signals 1808 using peer-to-peer traffic segment 12.

However, WT 4 112 determines that it is not going to use its assigned peer-to-peer traffic segment 13. WT 4 112 generates and broadcasts resource availability indicator in signal 1810, using the resource availability channel resource which corresponds to peer-to-peer traffic segment 13. Signals 1810 is detected by wireless terminal 1 106. Wireless terminal 1 106 recognizes that that traffic segment 13 will not be used by the device to which it was assigned. WT 1 106 generates and transmits peer-to-peer traffic signals 1812, using the air link resources of traffic segment 13, to wireless terminal 2 108.

WT 4 112 decides that it is going to use peer-to-peer traffic segment 14 and therefore generates peer-to-peer traffic signals 1814 and transmits signals 1814 over its assigned peer-to-peer traffic segment 14 to wireless terminal 3 110. Similarly, WT 4 112 decides to use and uses each of its remaining assigned segments through and including segment 90 in which it transmits peer-to-peer traffic signals 1816 using peer-to-peer traffic segment 90.

Drawing 1900 of FIG. 19 includes exemplary base station 102 and exemplary wireless terminals (wireless terminal 1 106, wireless terminal 2 108, wireless terminal 5 114, wireless terminal N 116) of system 100 of FIG. 1. WT N 116 generates and transmits peer-to-peer assignment request signal 1902 requesting assignment of peer-to-peer communications resources for a period of time. Consider that WT N 116 is requesting assignment of peer-to-peer communications resources for a period of time including 75 peer-to-peer traffic slots in the timing structure. Base station 102 receives assignment request signal 1902 and decides to assign WT N 116 peer-to-peer communications resources for a period of time including 70 peer-to-peer traffic slots. Base station 102 generates and transmits the peer-to-peer resource assignment signal 1904 communicating the assignment of peer-to-peer communications resources including 70 successive peer-to-peer traffic segments. WT N 116 receives and processes the assignment signal 1904. WT 1 106 also receives and processes the assignment signal 1904 and recognizes that the 70 peer-to-peer traffic segments have been assigned to WT N 116.

WT N 116 may now use its assigned peer-to-peer communications resources. Before each individual one of its assigned peer-to-peer traffic segments occurs WT N 116 makes a decision as to whether or it is going to use its assigned peer-to-peer traffic segment. In this example, WT N 116 has decided that it is going to use peer to peer traffic segment 1 and therefore generates peer-to-peer traffic signals 1906 and transmits signals 1906 over its assigned peer-to-peer traffic segment 1 to wireless terminal 5 114. Wireless terminal 1 106 also receives signals 1906, measures the power of received signals 1906, estimates a level of interference that it will cause to the peer-to-peer communications between WT N 116 and WT 5 114 if WT 1 106 should concurrently transmit to WT 2 108 on the same resources being used by WT N 116. In this example, consider that WT 1 106 decides it will be acceptable for it to transmit in the future on the same resource assigned to WT N 116 based on its estimate of interference that it is expected to cause, e.g., it is expected to be below a predetermined acceptable threshold level. For example, WT N 116 and WT 5 114 may be very close to one another, WT 1 106 and WT 2 108 may be very close to one another and WT 1 106 may be very far away from WT 5 114.

In this example, WT N 116 has decided that it is going to use peer-to-peer traffic segment 2 and therefore generates peer-to-peer traffic signals 1908 and transmits signals 1908 over its assigned peer-to-peer traffic segment 2 to wireless terminal 5 114. In this example, WT N 116 has decided that it is going to use peer-to-peer traffic segment 3 and therefore generates peer to peer traffic signals 1910 and transmits signals 1910 over its assigned peer-to-peer traffic segment 3 to wireless terminal 5 114. WT 1 106 decides that it is also going to use peer-to-peer traffic segment 3, WT 1 106 generates and transmits peer-to-peer traffic signals 1912 to WT 2 108 over traffic segment 3.

WT N 116 decides to use and uses each of its remaining assigned segments through and including segment 70 in which it transmits peer-to-peer traffic signals 1914 using peer-to-peer traffic segment 70.

Figure 20:
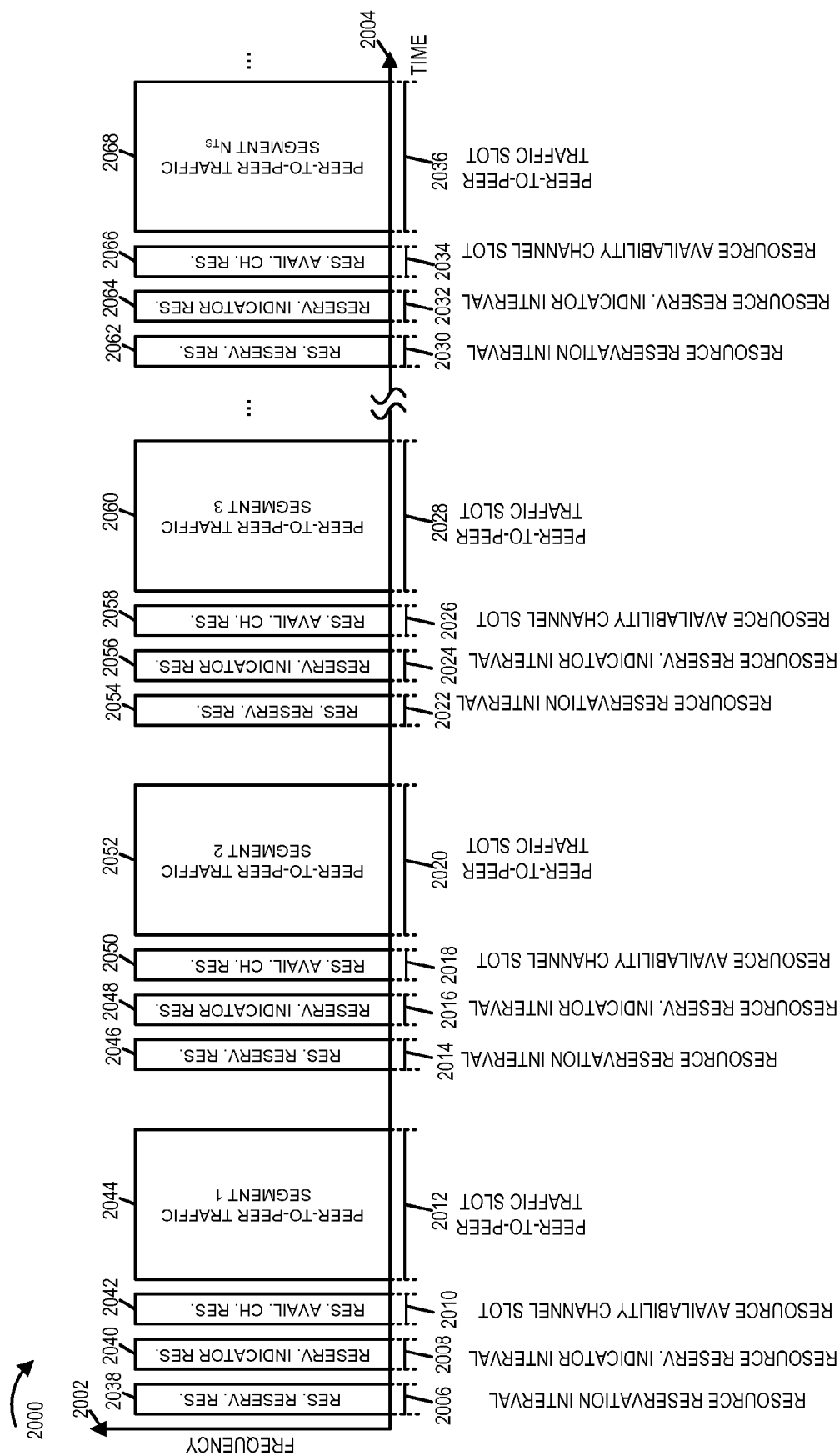
FIG. 20 is a drawing of an exemplary timing-frequency structure in accordance with an exemplary embodiment.

FIG. 20 is a drawing 2000 of an exemplary timing-frequency structure in accordance with an exemplary embodiment. The exemplary timing-frequency structure is, e.g., used by system 500 of FIG. 5. Vertical axis 2002 represents frequency, e.g., tones, and the horizontal axis 2004 represent time, e.g., OFDM symbol transmission time intervals. The exemplary timing structure includes resource reservation intervals, resource reservation indicator intervals, resource availability channel slots and peer-to-peer traffic slots. The air link resources include: resource reservation resources for carrying peer-to-peer resource reservation signals reserving peer-to-peer communications resources for a period of time which is at least N times a time period between resource reservation signaling intervals where N is positive integer greater than 2, resource reservation indicator resources for carrying peer-to-peer communications resource reservation indicator signals, resource availability channel resources for carrying resource availability indicators transmitted by peer-to-peer communications device with reserved peer-to-peer communications resources and intended to be received by other peer-to-peer communications devices, and peer-to-peer traffic segments for carrying peer-to-peer traffic signals between peer-to-peer communications devices.

In this example, resource reservation resource 2038 corresponds to resource reservation interval 2006; reservation indicator resource 2040 corresponds to resource reservation indicator interval 2008; resource availability channel resource 2042 corresponds to resource availability channel slot 2010; and peer-to-peer traffic segment 1 2044 corresponds to peer-to-peer traffic slot 2012. Resource reservation resource 2046 corresponds to resource reservation interval 2014; reservation indicator resource 2048 corresponds to resource reservation indicator interval 2016; resource availability channel resource 2050 corresponds to resource availability channel slot 2018; and peer-to-peer traffic segment 2 2052 corresponds to peer-to-peer traffic slot 2020. Resource reservation resource 2054 corresponds to resource reservation interval 2022; reservation indicator resource 2056 corresponds to resource reservation indicator interval 2024; resource availability channel resource 2058 corresponds to resource availability channel slot 2026; and peer-to-peer traffic segment 3 2060 corresponds to peer-to-peer traffic slot 2028. Resource reservation resource 2062 corresponds to resource reservation interval 2030; reservation indicator resource 2064 corresponds to resource reservation indicator interval 2032; resource availability channel resource 2066 corresponds to resource availability channel slot 2034; and peer-to-peer traffic segment $N_{TS}$ 2068 corresponds to peer-to-peer traffic slot 2036.

In this example, there is a known predetermined relationship between resource availability channel resources and peer-to-peer traffic segments. A channel availability indicated communicated on channel availability resource 2042 refers to peer-to-peer traffic segment 1 2044. A channel availability indicated communicated on channel availability resource 2050 refers to peer-to-peer traffic segment 2 2052. A channel availability indicated communicated on channel availability resource 2058 refers to peer-to-peer traffic segment 3 2060. A channel availability indicated communicated on channel availability resource 2066 refers to peer-to-peer traffic segment $N_{TS}$ 2068.

A peer-to-peer communications resource reservation signal communicated on a resource reservation resource refers to a plurality of peer-to-peer segments, e.g. two or more segments but generally a much larger number, e.g., 40 or more peer-to-peer segments. In some embodiments, the resource reservation signals communicates a period of time in which resources are to be reserved. The assignment is a persistent or semi-persistent assignment of peer-to-peer communications resources. For example, a peer-to-peer communications device transmit its resource reservation signal, e.g., reserving peer-to-peer communications resources including the next 50 peer-to-peer traffic segments in resource reservation resource 2038. As another example, a peer-to-peer communications device transmit its resource reservation signal, e.g., reserving peer-to-peer communications resources including a set of every fifth peer-to-peer traffic segment in the structure for a total of 50 peer-to-peer traffic segments, in resource reservation resource 2038. The peer-to-peer communications device does not transmit another resource reservation signal during the time interval for which it has reserved the peer-to-peer communications resources, e.g., the device does not transmit a signal in resource 2046 or 2054. In various embodiments, the peer-to-peer communications device, which has reserved peer-to-peer communications resources occasionally transmits a reservation indicator signal in a reservation indicator resource, e.g., at least once every M seconds where M is greater than the period between two resource reservation intervals and is a maximum amount of time a device is allowed to go without transmitting a signal indicating that it has reserved peer-to-peer communications resources.

Figure 21:
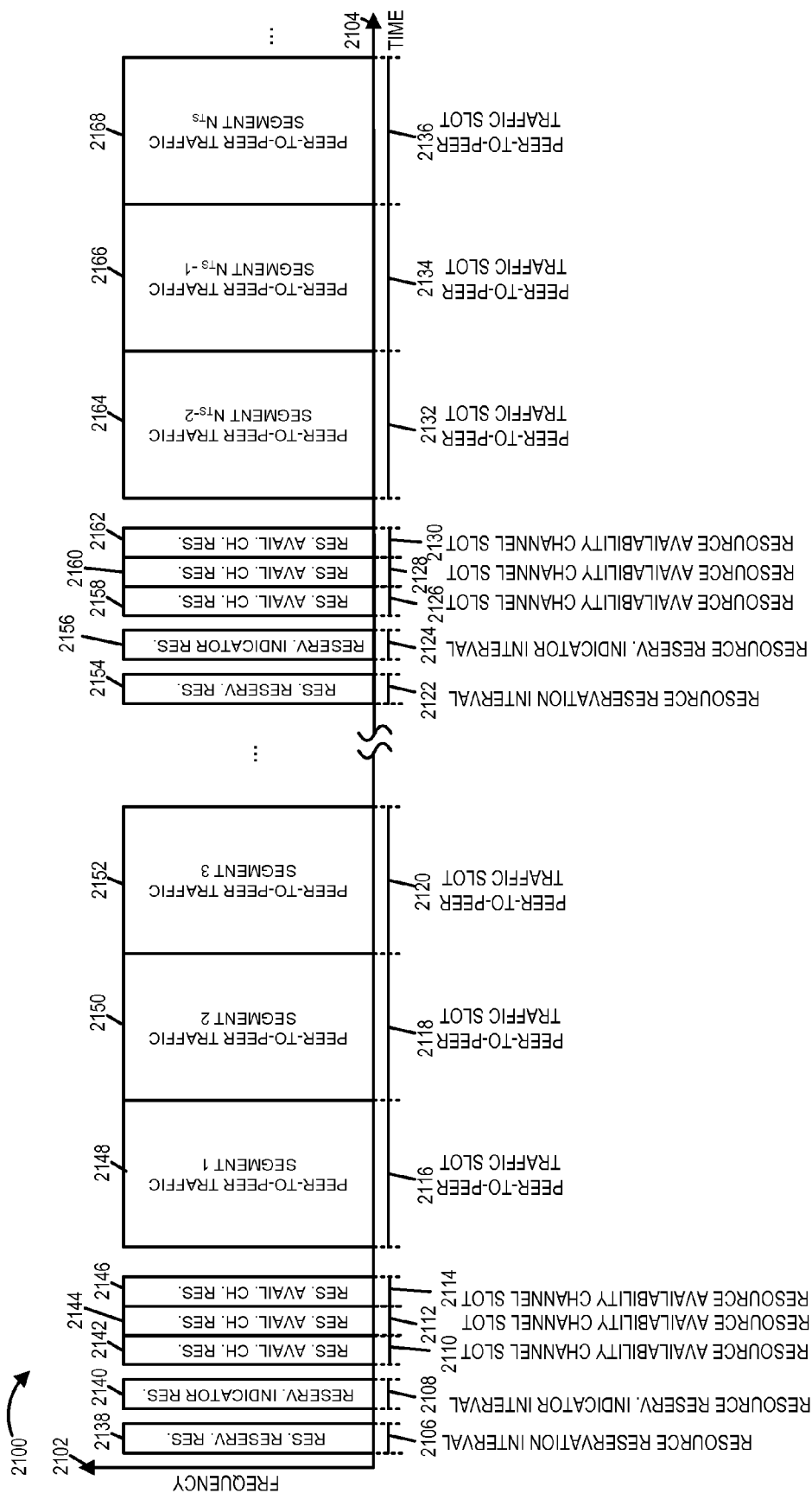
FIG. 21 is a drawing of an exemplary timing-frequency structure in accordance with an exemplary embodiment.

FIG. 21 is a drawing 2100 of an exemplary timing-frequency structure in accordance with an exemplary embodiment. The exemplary timing-frequency structure is, e.g., used by system 500 of FIG. 5. Vertical axis 2102 represents frequency, e.g., tones, and the horizontal axis 2104 represent time, e.g., OFDM symbol transmission time intervals. The exemplary timing structure includes resource reservation intervals, resource reservation indicator intervals, resource availability channel slots and peer-to-peer traffic slots. The air link resources include: resource reservation resources for carrying peer-to-peer resource reservation signals reserving peer-to-peer communications resources for a period of time which is at least N times a time period between resource reservation signaling intervals where N is positive integer greater than 2, resource reservation indicator resources for carrying peer-to-peer communications resource reservation indicator signals, resource availability channel resources for carrying resource availability indicators transmitted by peer-to-peer communications device with reserved peer-to-peer communications resources and intended to be received by other peer-to-peer communications devices, and peer-to-peer traffic segments for carrying peer-to-peer traffic signals between peer-to-peer communications devices.

In this example, resource reservation resource 2138 corresponds to resource reservation interval 2106; reservation indicator resource 2140 corresponds to resource reservation indicator interval 2108; resource availability channel resource 2142 corresponds to resource availability channel slot 2110; resource availability channel resource 2144 corresponds to resource availability channel slot 2112; resource availability channel resource 2146 corresponds to resource availability channel slot 2114; peer-to-peer traffic segment 1 2148 corresponds to peer-to-peer traffic slot 2116; peer-to-peer traffic segment 2 2150 corresponds to peer-to-peer traffic slot 2118; and peer-to-peer traffic segment 3 2152 corresponds to peer-to-peer traffic slot 2120. Resource reservation resource 2154 corresponds to resource reservation interval 2122; reservation indicator resource 2156 corresponds to resource reservation indicator interval 2124; resource availability channel resource 2158 corresponds to resource availability channel slot 2126; resource availability channel resource 2160 corresponds to resource availability channel slot 2128; resource availability channel resource 2162 corresponds to resource availability channel slot 2130; peer-to-peer traffic segment $N_{TS}$-2 2164 corresponds to peer-to-peer traffic slot 2132; peer-to-peer traffic segment $N_{TS}$-1 2166 corresponds to peer-to-peer traffic slot 2134; and peer-to-peer traffic segment $N_{TS}$ 2168 corresponds to peer-to-peer traffic slot 2136.

In this example, there is a known predetermined relationship between resource availability channel resources and peer-to-peer traffic segments. Having a known predetermined relationship, e.g., mapping, between a resource availability channel resource and a particular peer-to-peer traffic segment in the timing-frequency structure eliminates the need for using information bits in a channel availability indicator signal to identify the peer-to-peer segment to which a peer-to-peer channel availability indicator refers thereby reducing signaling overhead. A channel availability indicator communicated on channel availability resource 2142 refers to peer-to-peer traffic segment 1 2148. A channel availability indicator communicated on channel availability resource 2144 refers to peer-to-peer traffic segment 2 2150. A channel availability indicator communicated on channel availability resource 2146 refers to peer-to-peer traffic segment 3 2152. A channel availability indicator communicated on channel availability resource 2158 refers to peer-to-peer traffic segment $N_{TS}$-2 2164. A channel availability indicator communicated on channel availability resource 2160 refers to peer-to-peer traffic segment $N_{TS}$-1 2166. A channel availability indicator communicated on channel availability resource 2162 refers to peer-to-peer traffic segment $N_{TS}$ 2168.

A peer-to-peer communications resource reservation signal communicated on a resource reservation resource refers to a plurality of peer-to-peer segments, e.g. two or more segments but generally a much larger number, e.g., 40 or more peer-to-peer segments. In some embodiments, the resource reservation signals communicates a period of time in which resources are to be reserved. The assignment is a persistent or semi-persistent assignment of peer-to-peer communications resources. For example, a peer-to-peer communications device transmits its resource reservation signal, e.g., reserving peer-to-peer communications resources including the next 50 peer-to-peer traffic segments in resource reservation resource 2138. As another example, a peer-to-peer communications device transmits its resource reservation signal, e.g., reserving peer-to-peer communications resources including a set of every fifth peer-to-peer traffic segment in the structure for a total of 50 peer-to-peer traffic segments, in resource reservation resource 2138. The peer-to-peer communications device does not transmit another resource reservation signal during the time interval for which it has reserved the peer-to-peer communications resources. In various embodiments, the peer-to-peer communications device, which has reserved peer-to-peer communications resources occasionally transmits a reservation indicator signal in a reservation indicator resource, e.g., at least once every M seconds where M is greater than the period between two resource reservation intervals and is a maximum amount of time a device is allowed to go without transmitting a signal indicating that it has reserved peer-to-peer communications resources.

Figure 22:
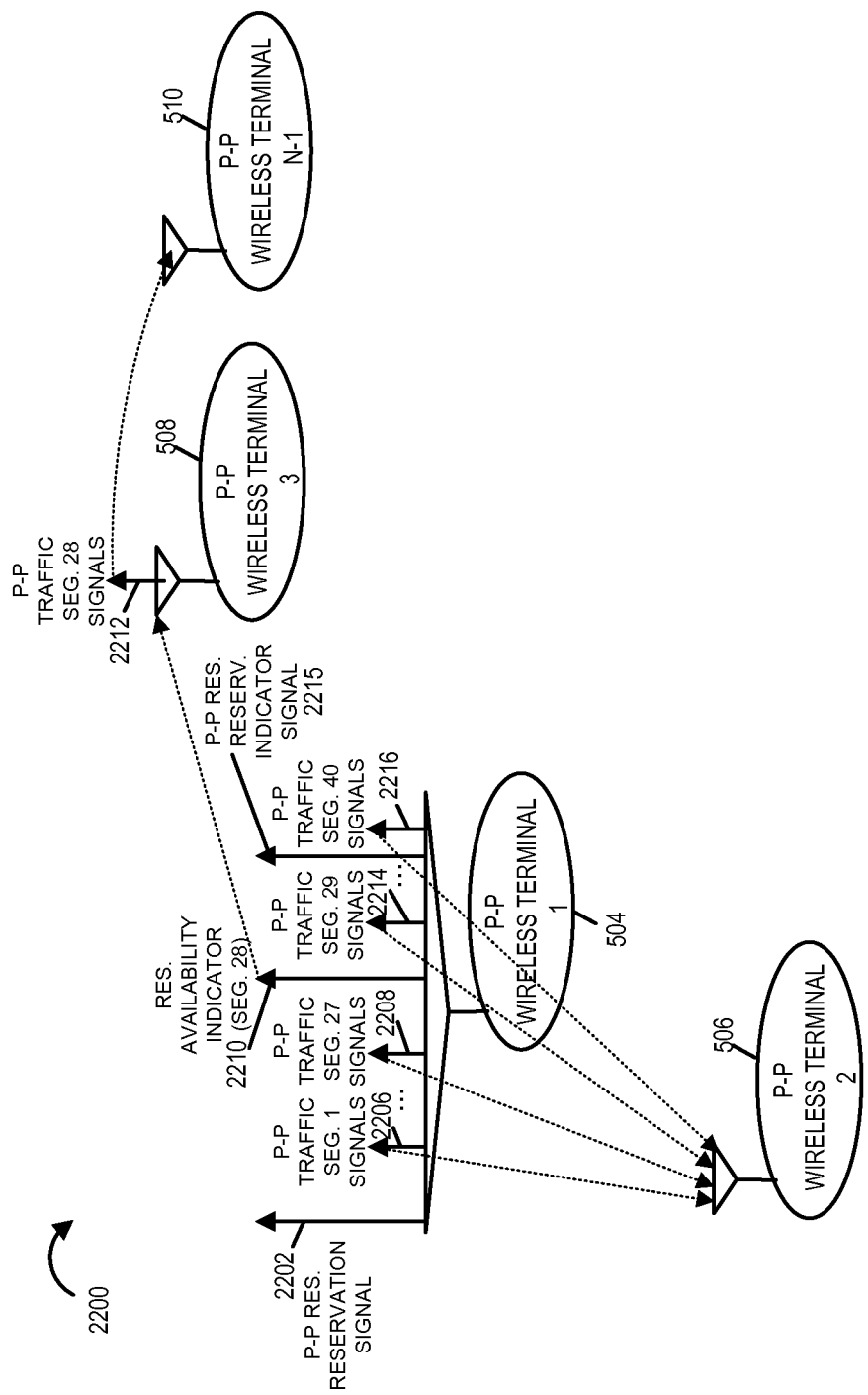
FIG. 22 is a drawing illustrating an example in which an exemplary wireless terminal self-reserves peer-to-peer communications resources for an extended period of time, decides that it is not intending to use one of its reserved peer-to-peer communications resources, and broadcasts a resource availability indicator.
Figure 23:
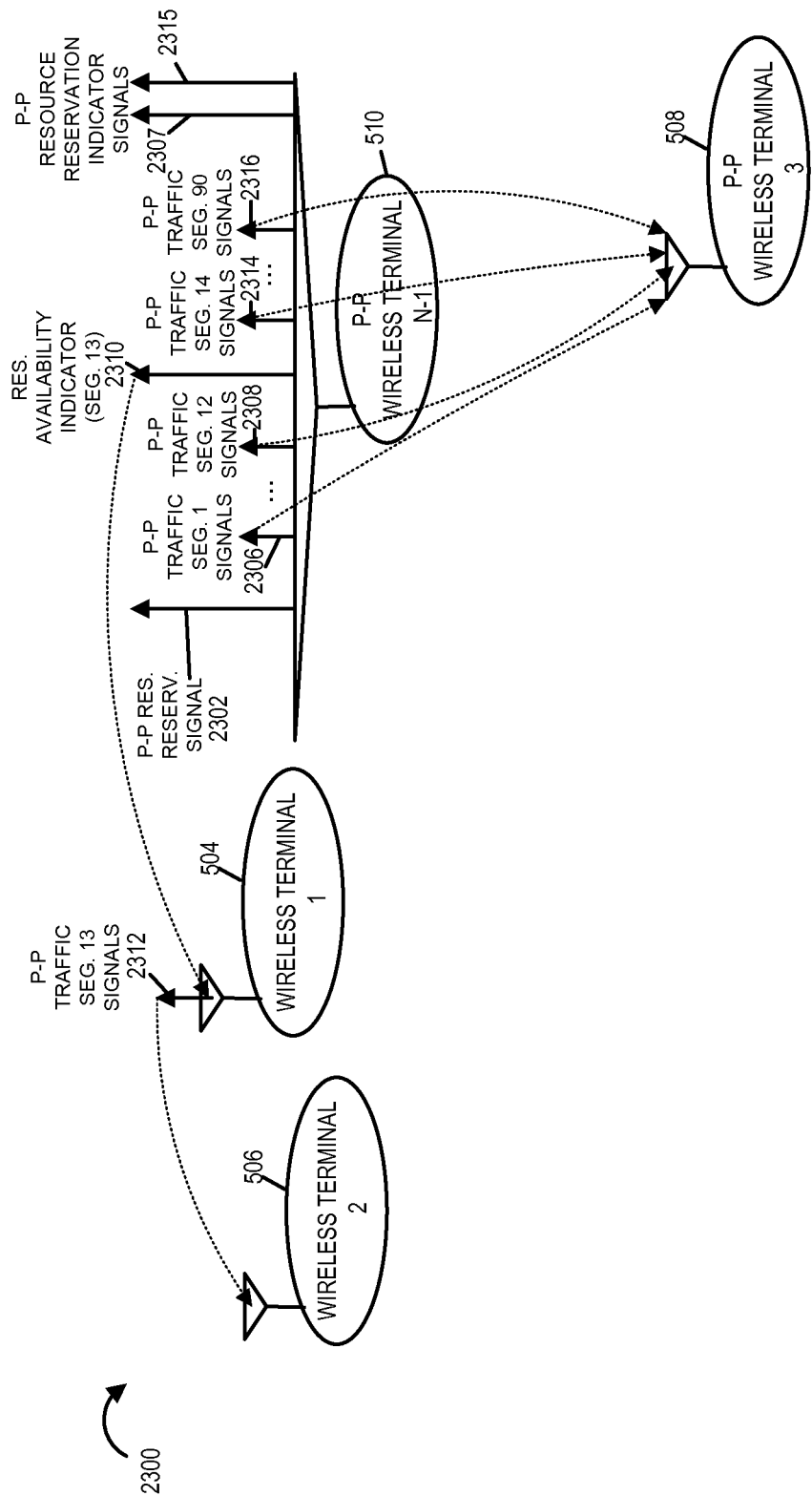
FIG. 23 is a drawing illustrating an example, in which the wireless terminal of FIG. 22 detects a resource availability indicator and uses a peer-to-peer communications resource that was reserved by another wireless terminal which decided not to use its reserved resource.
Figure 24:
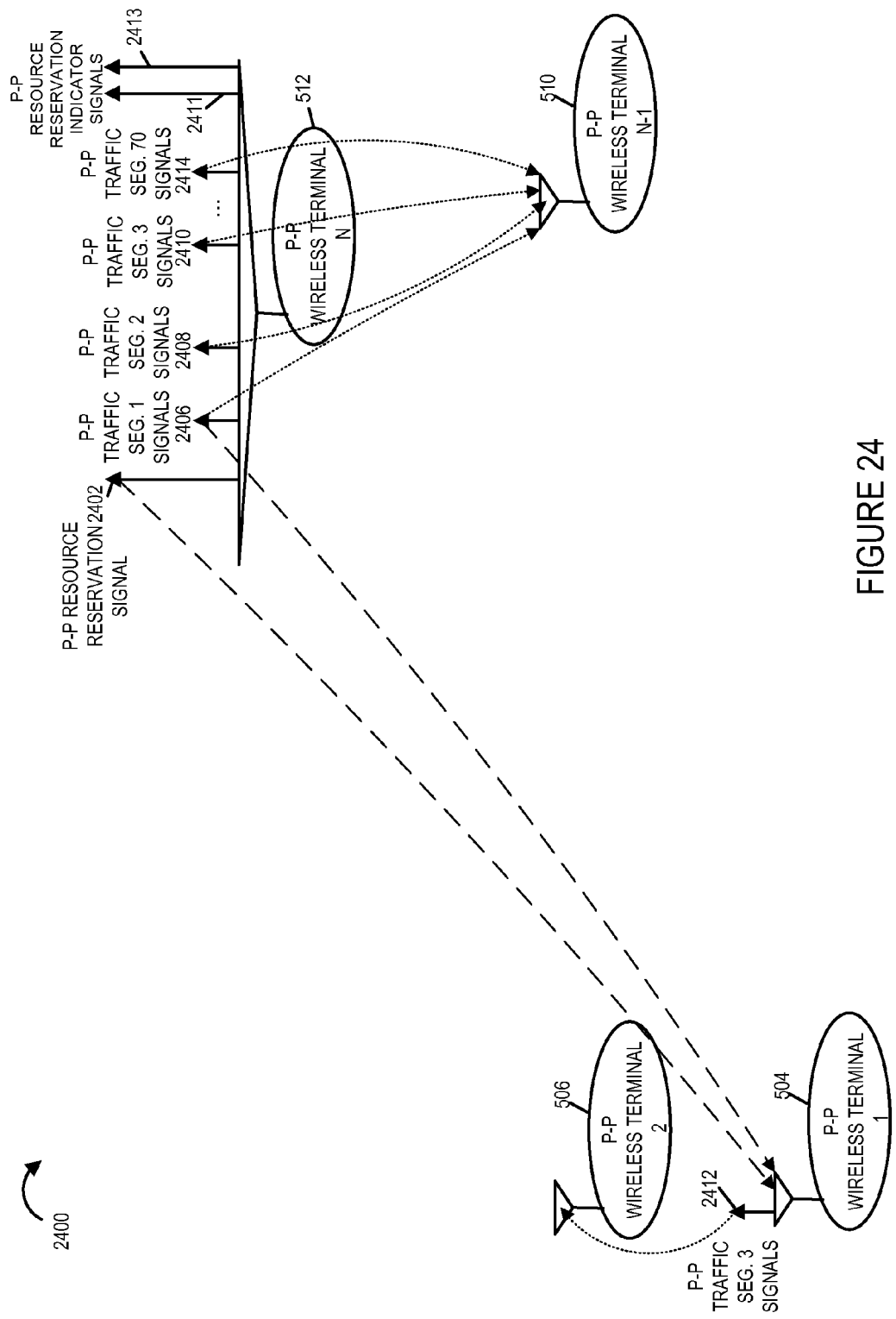
FIG. 24 is a drawing illustrating an example, in which the wireless terminal of FIG. 22 detects a peer-to-peer communications resource reservation signal from another wireless terminal, measures signals communicated by the another wireless terminal on the reserved resource and decides whether or not it can also use the reserved as a function of the measured signals.

FIG. 22-24 illustrate an example of operating a peer-to-peer communications device, e.g., a mobile wireless terminal supporting peer-to-peer communications, in accordance with an exemplary embodiment. Drawing 2200 of FIG. 22 includes exemplary peer-to-peer wireless terminals (wireless terminal 1 504, wireless terminal 2 506, wireless terminal 3 508, wireless terminal N-1 510) of system 500 of FIG. 4. WT 1 504 generates and transmits peer-to-peer resource reservation signal 2202 communicating that it is reserving peer-to-peer communications resources for a period of time. Consider that WT 1 504 is reserving peer-to-peer communications resources for a period of time including 40 peer-to-peer traffic slots in the timing structure.

WT 1 504 may now use its reserved peer-to-peer communications resources. Before each of its reserved peer-to-peer traffic segment occurs WT 1 504 makes a decision as to whether or not it is going to use its reserved peer-to-peer traffic segment. In this example, WT 1 504 has decided that it is going to use peer to peer traffic segment 1 and therefore generates peer-to-peer traffic signals 2206 and transmits signals 2206 over its reserved peer-to-peer traffic segment 1 to wireless terminal 2 506. Similarly, WT 1 decides to use and uses each of its reserved segment through segment 27 in which it transmits peer-to-peer traffic signals 2208 using peer-to-peer traffic segment 27.

However, WT 1 504 determines that it is not going to use its reserved peer-to-peer traffic segment 28. WT 1 504 generates and broadcasts resource availability indicator in signal 2210, using the resource availability channel resource which corresponds to peer-to-peer traffic segment 28. Signals 2110 is detected by wireless terminal 3 508. Wireless terminal 3 508 recognizes that the traffic segment 28 will not be used by the device which reserved the peer-to-peer communications resource. WT 3 508 generates and transmits peer-to-peer traffic signals 2212, using the air link resources of traffic segment 28, to wireless terminal N-1 510.

WT 1 504 decides that it is going to use peer to peer traffic segment 29 and therefore generates peer to peer traffic signals 2214 and transmits signals 2214 over its reserved peer-to-peer traffic segment 29 to wireless terminal 2. Similarly, WT 1 decides to use and uses each of its remaining reserved segments through and including segment 40 in which it transmits peer-to-peer traffic signals 2216 using peer-to-peer traffic segment 40.

During the time in which the device has reserved peer-to-peer communications resources, it occasionally broadcasts a peer-to-peer resource reservation indicator signal on a reservation indicator resource. In some embodiments, it broadcasts the indicator signal at least once every M seconds where M is greater than the period between two resource reservation intervals and is a maximum amount of time a device, which has reserved peer-to-peer communications resources, is allowed to go without transmitting a signal that it has reserved resources. In this example, WT 1 504 transmits peer-to-peer resource reservation indicator signal 2215 after communicating traffic signals in peer-to-peer communications resource for traffic segment 33.

Drawing 2300 of FIG. 23 includes exemplary peer-to-peer wireless terminals (wireless terminal 1 504, wireless terminal 2 506, wireless terminal 3 508, wireless terminal N-1 510) of system 500 of FIG. 5. WT N-1 510 generates and transmits peer-to-peer resource reservation signal 2302 communicating that it is reserving peer-to-peer communications resources for a period of time. Consider that WT N-1 510 is reserving peer-to-peer communications resources for a period of time including 90 successive peer-to-peer traffic slots in the timing structure.

WT N-1 510 may now use its reserved peer-to-peer communications resources. Before each of its reserved peer-to-peer traffic segment occurs WT N-1 510 makes a decision as to whether or not it is going to use its reserved peer-to-peer traffic segment. In this example, WT N-1 510 has decided that it is going to use peer-to-peer traffic segment 1 and therefore generates peer to peer traffic signals 2306 and transmits signals 2306 over its reserved peer-to-peer traffic segment 1 to wireless terminal 3 508. Similarly, WT N-1 510 decides to use and uses each of its reserved segments through segment 12 in which it transmits peer-to-peer traffic signals 2308 using peer-to-peer traffic segment 12.

However, WT N-1 510 determines that it is not going to use its reserved peer-to-peer traffic segment 13. WT N-1 510 generates and broadcasts resource availability indicator in signal 2310, using the resource availability channel resource which corresponds to peer-to-peer traffic segment 13. Signals 2310 is detected by wireless terminal 1 504. Wireless terminal 1 504 recognizes that that traffic segment 13 will not be used by the device which reserved the peer-to-peer communications resource. WT 1 504 generates and transmits peer-to-peer traffic signals 2312, using the air link resources of traffic segment 13, to wireless terminal 2 506.

WT N-1 510 decides that it is going to use peer-to-peer traffic segment 14 and therefore generates peer-to-peer traffic signals 2314 and transmits signals 2314 over its reserved peer-to-peer traffic segment 14 to wireless terminal 3 508. Similarly, WT N-1 510 decides to use and uses each of its remaining assigned segments through and including segment 90 in which it transmits peer-to-peer traffic signals 2316 using peer-to-peer traffic segment 90.

During the time in which device has reserved peer-to-peer communications resources, it occasionally broadcasts a peer-to-peer resource reservation indicator signal on a reservation indicator resource. In this example, WT N-1 510 transmits peer-to-peer resource reservation indicator signal 2307 after communicating traffic signals in peer-to-peer communications resource for traffic segment 33 and transmits peer-to-peer resource reservation indicator signal 2315 after communicating traffic signals in peer-to-peer communications resource for traffic segment 66.

Drawing 2400 of FIG. 24 includes exemplary peer-to-peer wireless terminals (wireless terminal 1 504, wireless terminal 2 506, wireless terminal N-1 510, wireless terminal N 512) of system 500 of FIG. 5. WT N 512 generates and transmits peer-to-peer resource reservation signal 2402 communicating that it is reserving peer-to-peer communications resources for a period of time. Consider that WT N 512 is reserving peer-to-peer communications resources for a period of time including 70 successive peer-to-peer traffic slots in the timing structure. WT 1 504 also receives and processes the resource reservation signal 2402 and recognizes that the 70 peer-to-peer traffic segments have been reserved by WT N 512.

WT N 512 may now use its reserved peer-to-peer communications resources. Before each individual one of its assigned peer-to-peer traffic segments occurs WT N 512 makes a decision as to whether or not it is going to use its reserved peer-to-peer traffic segment. In this example, WT N 512 has decided that it is going to use peer to peer traffic segment 1 and therefore generates peer-to-peer traffic signals 2406 and transmits signals 2406 over its reserved peer-to-peer traffic segment 1 to wireless terminal N-1 510. Wireless terminal 1 504 also receives signals 2406, measures the power of received signals 2406, estimates a level of interference that it will cause to the peer-to-peer communications between WT N 512 and WT N-1 510 if WT 1 504 should concurrently transmit to WT 2 506 on the same resources being used by WT N 512. In this example, consider that WT 1 504 decides it will be acceptable for it to transmit in the future on the same resource reserved by WT N 512 based on its estimate of interference that it is expected to cause, e.g., it is expected to be below a predetermined acceptable threshold level. For example, WT N 512 and WT N-1 510 may be very close to one another, WT 1 504 and WT 2 506 may be very close to one another and WT 1 504 may be very far away from WT N 512.

In this example, WT N 512 has decided that it is going to use peer-to-peer traffic segment 2 and therefore generates peer-to-peer traffic signals 2408 and transmits signals 2408 over its assigned peer-to-peer traffic segment 2 to wireless terminal N-1 510. In this example, WT N 512 has decided that it is going to use peer-to-peer traffic segment 3 and therefore generates peer-to-peer traffic signals 2410 and transmits signals 2410 over its assigned peer-to-peer traffic segment 3 to wireless terminal N-1 510. WT 1 504 decides that it is also going to use peer-to-peer traffic segment 3, WT 1 504 generates and transmits peer-to-peer traffic signals 2410 to WT 2 506 over traffic segment 3.

WT N 512 decides to use and uses each of its remaining assigned segments through and including segment 70 in which it transmits peer-to-peer traffic signals 2414 using peer-to-peer traffic segment 70.

During the time in which a device has reserved peer-to-peer communications resources, it occasionally broadcasts a peer-to-peer resource reservation indicator signal on a reservation indicator resource. In this example, WT N 512 transmits peer-to-peer resource reservation indicator signal 2411 after communicating traffic signals in peer-to-peer communications resource for traffic segment 33 and transmits peer-to-peer resource reservation indicator signal 2413 after communicating traffic signals in peer-to-peer communications resource for traffic segment 66.

Various aspects and/or features of some, but not necessarily all, embodiments will be further discussed. In various embodiments, semi-persistent or persistent assignment/reservation of resources for peer-to-peer communications are performed either through a resource requests made to a base station or via peer to peer resource acquisition signaling. In some embodiments, the transmission of a signal, e.g., a resource availability indicator signal, from a peer to peer device which has reserved a resource for an extended period of time, prior to the occurrence (traffic slot) of a reserved peer-to-peer communications resource is used to indicate that for the upcoming traffic interval the reserved resource will not be used by the device which reserved the resource and may be used by other devices.

When traffic is predictable and likely to continue for a period of time, e.g., voice traffic, semi-persistent scheduling can be, and sometimes is, used to reduce the overhead associated with obtaining resources for the traffic. Such a mechanism can also be, and sometimes is, used for low rate traffic flow with very tight latency requirements and a predictable nature. Semi-persistent scheduling refers to the assignment of a communications resource for a period of time which exceeds the interval at which communication resource assignment requests and/or resource reservations are normally made. Thus, resources can be requested/reserved for a period of time exceeding the period of time between assignment request intervals and the device need not compete for the resources during each resource request interval. The requested resources may be periodic in nature, e.g., a device may be allocated use of a channel for a period of time on a recurring basis with the period of time repeating at periodic or otherwise predetermined intervals. The duration of the period for which the assignment is to be made may be specified in the resource request with the grant of the resource assignment, e.g., in the case of base station resource assignments for D2D connections indicating the resource which is assigned and the duration of the assignment. In the case where resource allocation is performed in a distributed manner without the use of a base station or other centralized device, a D2D device may reserve a resource for an extended period of time which is longer than the period of time between resource reservation opportunities. Thus, after the initial reservation for the extended period of time the D2D device which reserved the resource need not transmit a resource request or reservation signal during each of the time periods used for resource reservation signaling. To allow devices which are entering a region or powering on to become aware of an extended resource reservation, the device which reserved the resource for an extended period of time transmits a reservation signal or message at least once during a maximum time period between transmission of reservation information. Thus, a device entering the system can remain quiet and monitor for the maximum period of time and become aware of any resource reservations, persistent or otherwise, before contending for resources. Thus, in the distributed resource reservation case, persistent resource reservations decrease the amount of D2D resource reservation signaling required and allow devices to obtain resources which can be used in a reliable manner for a time period extending many times the duration between resource reservation signaling time intervals.

A device granted a resource for a specified period of time need not compete with other devices for the resource during the period of time the device has been allocated or reserved the resource. Other devices refrain from requesting the assignment of the resource during the period of grant/reservation unless the device to which the resource is allocated indicates that the resource, although allocated to the device, will not be used by the device during the next traffic period.

In some embodiments an intent to use signal channel is associated with one or more communications channels which can be reserved/allocated for an extended period of time. A device to which a resource is assigned may signal that it will not use an allocated resource during the next traffic interval by setting a flag, e.g., a one bit flag corresponding to the resource which will not be used, and transmitting the flag prior to the resource request/contention signal period which can be used to request the resource which was allocated in a semi-persistent manner. The signaling channel used to signal an intent not to use a persistently assigned resource requires very few bits and allows resources which were assigned in a persistent manner to be used when the device to which the resource was assigned temporarily does not need the resource.

While in base station assisted embodiments, persistent allocation of resources may, and sometimes does, involve base station assignment of resources to D2D connections, when a device in a D2D connection signals that an assigned resource corresponding to a D2D connection will not be used in an upcoming traffic slot, D2D devices may contend and/or decide to use the resource without allocation from said base station after receiving a signal from the device to which the resource was allocated that it will go unused in a particular upcoming traffic slot.

Some methods and apparatus are directed to embodiments where a base station is involved in resource assignments. Other methods and apparatus are directed to embodiments, in which resource assignment/reservation is performed without the assistance of a base station.

For example an embodiment involving a base station will now be described. The exemplary base station is eNB, and UE A and UE B are exemplary mobile wireless terminals supporting WAN and direct peer to peer communications. eNB is involved in the scheduling for resource for data transfer from UE A to UE B.

UE A exchanges RRC messages with UE B to ascertain UE B's (local) cell id, CRNTI. Then, UE A sends SR to eNB, UE A gets scheduled on UL. UE A sends RRC message to request communication to UE B. Depending on the cell id of UE B and the QCI of the traffic, eNB will assign certain D2D resources for communication between A to B. If UE B is in cell, eNB can make assignment to UE B, else eNB forwards the request to the cell to which UE B is associated with. Both UE A and UE B are informed about resources assigned to them via PDCCH signaling. Other UEs (some could be in neighboring cells) are informed about this resource being granted via broadcast signaling using, e.g., PDCCH, PDSCH. These UEs measure interference on Data and ACK/NACK channels corresponding to the resource granted. In some embodiments, they can transmit/receive on these resources only if they don't detect high enough energy for N consecutive occurrences of these resources, e.g., the detected energy is below a predetermined threshold. In various embodiments, a similar procedure is used to tear down a connection. In various embodiments, there are MAC layer rules for empty buffer leading to disconnect.

In various embodiments, when a device, e.g., UE A, which has acquired peer-to-peer communications resources, e.g., from eNB, decides that it will temporarily not be using its assigned resources for a limited period of time, the device generates and transmits a resource availability indicator to notify other devices that its assigned peer-to-peer communications resource will not be used, so that another device may use the resource.

An embodiment where a base station is not involved in the allocation/reservation of resources will now be described. In this example there are peer-to-peer communications devices, e.g., mobile device A and mobile device B supporting direct device to device communications. Some embodiments involve distributed scheduling, e.g., distributed scheduling of D2D reservation/allocation of resources without base station involvement. In one embodiment, the first RTS and CTS transmitted by device A and device B, respectively, include information about which D2D resources will be used for communication between device A and device B. However, devices which do not decode the RTS/CTS, need to be aware of ongoing transmissions over the D2D resource obtained by link A-B. Moreover, the TX device A may not have a packet to transmit at certain times when the semi-persistent resource is allocated to it. In such a case the resource should be allowed to be used by other links. In order to achieve this, device A and device B, in some embodiments, transmit one bit of information, e.g., via for example, a channel similar to Scheduling Request in LTE, before occurrence of each semi-persistently assigned resource. In one such embodiment, the bit is set if A has packets pending to be transmitted to B. Specifically, this one bit transmission, in some embodiments, occur time T in advance, where T is such that RTS transmitted by a TX at time t contends for resources at time (t+T). Such one bit of signaling is more efficient than a full RTS, CTS transmission before each data packet.

In various embodiments a device, e.g., a mobile wireless terminal supporting WAN and peer to peer signaling in system 100 of FIG. 1, and/or a wireless terminal 300 of FIG. 3, and/or a peer-to-peer communications device of system 500 of FIG. 5 and/or a wireless terminal 1000 of FIG. 10 and/or a peer-to-peer communications device 1300 of FIG. 13 and/or one of the wireless terminals of any of the Figures includes a module corresponding to each of the individual steps and/or operations described with regard to any of the Figures in the present application and/or described in the detailed description of the present application. In some embodiments, the modules are implemented in hardware, e.g., in the form of circuits. Thus, in at least some embodiments the modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals supporting peer to peer communications, access points such as base stations, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., a communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless terminal, the method comprising:
   requesting assignment of peer-to-peer communications resources for a period of time which is at least N times a time period between resource assignment request intervals, N being a positive integer greater than 2; and
   receiving a peer-to-peer communications resource assignment indicating assignment of resources for an assigned time period which is at least M times a time period between resource request intervals,
   where M and N are used to indicate at least one of a semi-persistent assignment or a persistent assignment of the peer-to-peer communications resources to the wireless terminal.

2. The method of claim 1, where M is less than or equal to N, and further comprising:
   refraining from requesting assignment of said assigned resources during said assigned time period; and
   using at least some of the assigned resources during said assigned time period.

3. The method of claim 2, further comprising:
   determining not to use one of the assigned resources during said assigned time period; and
   broadcasting a resource availability indicator, prior to a traffic time period in which said one of the assigned resources will not be used.

4. The method of claim 3, wherein the resource availability indicator is a one bit indicator transmitted in a slot of a resource availability channel, said slot having a predetermined known relationship to the one of the assigned resources which will not be used.

5. The method of claim 4, further comprising:
   detecting a resource availability indicator transmitted by another device indicating that a communications resource assigned to the another device will not be used; and
   using the communications resource that said availability indicator indicates will not be used by the device to which the resource was assigned.

6. The wireless terminal of claim 4, further comprising:
   means for detecting a resource availability indicator transmitted by another device indicating that a communications resource assigned to the another device will not be used; and
   means for using the communications resource that said availability indicator indicates will not be used by the device to which the resource was assigned.

7. A wireless terminal comprising:
   means for requesting assignment of peer-to-peer communications resources for a period of time which is at least N times a time period between resource assignment request intervals, N being a positive integer greater than 2; and
   means for receiving a peer-to-peer communications resource assignment indicating assignment of resources for an assigned time period which is at least M times a time period between resource request intervals,
   where M and N are used to indicate at least one of a semi-persistent assignment or a persistent assignment of the peer-to-peer communications resources to the wireless terminal.

8. The wireless terminal of claim 7, where M is less than or equal to N, and further comprising:
   means for refraining from requesting assignment of said assigned resources during said assigned time period; and
   means for using at least some of the assigned resources during said assigned time period.

9. The wireless terminal of claim 8, further comprising:
   means for determining not to use one of the assigned resources during said assigned time period; and
   means for broadcasting a resource availability indicator, prior to a traffic time period in which said one of the assigned resources will not be used.

10. The wireless terminal of claim 9, wherein the resource availability indicator is a one bit indicator transmitted in a slot of a resource availability channel, said slot having a predetermined known relationship to the one of the assigned resources which will not be used.

11. A computer program product for use in a wireless terminal, the computer program product comprising:
a non-transitory computer readable medium comprising:
code for causing at least one computer to request assignment of peer-to-peer communications resources for a period of time which is at least N times a time period between resource assignment request intervals, N being a positive integer greater than 2; and
code for causing said at least one computer to receive a peer-to-peer communications resource assignment indicating assignment of resources for an assigned time period which is at least M times a time period between resource request intervals,
where M and N are used to indicate at least one of a semi-persistent assignment or a persistent assignment of the peer-to-peer communications resources to the wireless terminal.

12. A wireless terminal comprising:
at least one processor configured to:
request assignment of peer-to-peer communications resources for a period of time which is at least N times a time period between resource assignment request intervals, N being a positive integer greater than 2; and
receive a peer-to-peer communications resource assignment indicating assignment of resources for an assigned time period which is at least M times a time period between resource request intervals, where M and N are used to indicate at least one of a semi-persistent assignment or a persistent assignment of the peer-to-peer communications resources to the wireless terminal; and
memory coupled to said at least one processor.

13. The wireless terminal of claim 12, where M is less than or equal to N, and wherein said at least one processor is further configured to:
refrain from requesting assignment of said assigned resources during said assigned time period; and
use at least some of the assigned resources during said assigned time period.

14. The wireless terminal of claim 13, wherein said at least one processor is further configured to:
determine not to use one of the assigned resources during said assigned time period; and
broadcast a resource availability indicator, prior to a traffic time period in which said one of the assigned resources will not be used.

15. The wireless terminal of claim 14, wherein the resource availability indicator is a one bit indicator transmitted in a slot of a resource availability channel, said slot having a predetermined known relationship to the one of the assigned resources which will not be used.

16. A method of operating a peer-to-peer communications device, the method comprising:
transmitting a peer-to-peer resource reservation signal reserving peer-to-peer communications resources for a period of time which is at least N times a time period between resource reservation signaling intervals, N being a positive integer greater than 2;
refraining from transmitting a resource reservation signal reserving said peer-to-peer resources during said period of time;
using at least some of the reserved peer-to-peer resources during said period of time; and
during said period of time when said resources are reserved, transmitting a reservation indicator signal at least once every M seconds, where M is greater than the period between two resource reservation intervals and is a maximum amount of time a device is allowed to go without transmitting a signal indicating resources that it has reserved.

17. The method of claim 16, further comprising:
determining not to use one of the reserved resources during said reservation time period; and
broadcasting a resource availability indicator, prior to a traffic time period in which said one of the reserved resources will not be used.

18. The method of claim 17, wherein the resource availability indicator is a one bit indicator transmitted in a slot of a resource availability channel, said slot having a predetermined known relationship to the one of the reserved resources which will not be used.

19. The method of claim 18, further comprising:
detecting a resource availability indicator transmitted by another device indicating that a communications resource reserved by the another device will not be used; and
using the communications resource that said availability indicator indicates will not be used by the device which reserved the resource.

20. A peer-to-peer communications device comprising:
means for transmitting a peer-to-peer resource reservation signal reserving peer-to-peer communications resources for a period of time which is at least N times a time period between resource reservation signaling intervals, N being a positive integer greater than 2;
means for refraining from transmitting a resource reservation signal reserving said peer-to-peer resources during said period of time;
means for using at least some of the reserved peer-to-peer resources during said period of time; and
means for transmitting a reservation indicator signal at least once every M seconds during said period of time when said resources are reserved, where M is greater than the period between two resource reservation intervals and is a maximum amount of time a device is allowed to go without transmitting a signal indicating resources that it has reserved.

21. The peer-to-peer communications device of claim 20, further comprising:
means for determining not to use one of the reserved resources during said reservation time period; and
means for broadcasting a resource availability indicator, prior to a traffic time period in which said one of the reserved resources will not be used.

22. The peer-to-peer communications device of claim 21, wherein the resource availability indicator is a one bit indicator transmitted in a slot of a resource availability channel, said slot having a predetermined known relationship to the one of the reserved resources which will not be used.

23. The peer-to-peer communications device of claim 22, further comprising:
means for detecting a resource availability indicator transmitted by another device indicating that a communications resource reserved by the another device will not be used; and
means for using the communications resource that said availability indicator indicates will not be used by the device which reserved the resource.

24. A computer program product for use in a peer-to-peer communications device, the computer program product comprising:
  a non-transitory computer readable medium comprising:
    code for causing at least one computer to transmit a peer-to-peer resource reservation signal reserving peer-to-peer communications resources for a period of time which is at least N times a time period between resource reservation signaling intervals, N being a positive integer greater than 2;
    code for causing said at least one computer to refrain from transmitting a resource reservation signal reserving said peer-to-peer resources during said period of time;
    code for causing said at least one computer to use at least some of the reserved peer-to-peer resources during said period of time; and
    code for causing said at least one computer, during said period of time when said resources are reserved, to transmit a reservation indicator signal at least once every M seconds, where M is greater than the period between two resource reservation intervals and is a maximum amount of time a computer is allowed to go without transmitting a signal indicating resources that it has reserved.

25. A peer-to-peer communications device comprising:
  at least one processor configured to:
    transmit a peer-to-peer resource reservation signal reserving peer-to-peer communications resources for a period of time which is at least N times a time period between resource reservation signaling intervals, N being a positive integer greater than 2;
    refrain from transmitting a resource reservation signal reserving said peer-to-peer resources during said period of time;
    use at least some of the reserved peer-to-peer resources during said period of time; and
    transmit a reservation indicator signal at least once every M seconds during said period of time when said resources are reserved, where M is greater than the period between two resource reservation intervals and is a maximum amount of time a device is allowed to go without transmitting a signal indicating resources that it has reserved; and
  memory coupled to said at least one processor.

26. The peer-to-peer communications device of claim 25, wherein said at least one processor is further configured to:
  determine not to use one of the reserved resources during said reservation time period; and
  broadcast a resource availability indicator, prior to a traffic time period in which said one of the reserved resources will not be used.

27. The peer to peer communications device of claim 26, wherein the resource availability indicator is a one bit indicator transmitted in a slot of a resource availability channel, said slot having a predetermined known relationship to the one of the reserved resources which will not be used.

\* \* \* \* \*